(12) United States Patent
Choi et al.

(10) Patent No.: US 11,277,615 B2
(45) Date of Patent: Mar. 15, 2022

(54) INTRA-PREDICTION METHOD FOR REDUCING INTRA-PREDICTION ERRORS AND DEVICE FOR SAME

(71) Applicant: SAMSUNG ELECTRONICS CO., LTD., Suwon-si (KR)

(72) Inventors: In-kwon Choi, Seongnam-si (KR); Min-woo Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 758 days.

(21) Appl. No.: 16/077,830

(22) PCT Filed: Feb. 16, 2017

(86) PCT No.: PCT/KR2017/001718
§ 371 (c)(1),
(2) Date: Aug. 14, 2018

(87) PCT Pub. No.: WO2017/142327
PCT Pub. Date: Aug. 24, 2017

(65) Prior Publication Data
US 2021/0195199 A1 Jun. 24, 2021

Related U.S. Application Data

(60) Provisional application No. 62/295,687, filed on Feb. 16, 2016.

(51) Int. Cl.
*H04N 19/105* (2014.01)
*H04N 19/132* (2014.01)
*H04N 19/117* (2014.01)
*H04N 19/159* (2014.01)
*H04N 19/176* (2014.01)

(52) U.S. Cl.
CPC ......... *H04N 19/132* (2014.11); *H04N 19/105* (2014.11); *H04N 19/117* (2014.11); *H04N 19/159* (2014.11); *H04N 19/176* (2014.11)

(58) Field of Classification Search
CPC .... H04N 19/82; H04N 19/117; H04N 19/159; H04N 19/105; H04N 19/132; H04N 19/182
See application file for complete search history.

(56) References Cited

U.S. PATENT DOCUMENTS

| 8,149,910 B2 | 4/2012 | Tanizawa et al. |
| 9,083,974 B2 | 7/2015 | Jeon et al. |

(Continued)

FOREIGN PATENT DOCUMENTS

| CN | 101361370 A | 2/2009 |
| CN | 102972028 A | 3/2013 |

(Continued)

OTHER PUBLICATIONS

Constrained Intra prediction scheme for flexible size prediction in HEVC; Wahadaniah—2011; (Year: 2011).*

(Continued)

*Primary Examiner* — Luis Perez-Fuentes
(74) *Attorney, Agent, or Firm* — Sughrue Mion, PLLC

(57) ABSTRACT

Provided is an image predicting method including: obtaining a plurality of adjacent samples located adjacent to a current block; determining an adjacent sample as a reference sample to be referred to by a current sample, the adjacent sample being from among the plurality of adjacent samples and being indicated by a direction of an intra mode of the current block; and adjusting a sample value of the reference sample according to a reference distance indicating a distance between the reference sample and the current sample, and determining a prediction value of the current sample based on the adjusted sample value of the reference sample.

13 Claims, 24 Drawing Sheets

(56) References Cited

U.S. PATENT DOCUMENTS

| | | | |
|---|---|---|---|
| 9,088,780 | B2 | 7/2015 | Kim et al. |
| 9,247,247 | B2 | 1/2016 | Min et al. |
| 9,299,133 | B2* | 3/2016 | Minezawa .............. G06T 9/004 |
| 9,445,127 | B2* | 9/2016 | Kim ....................... H04N 19/82 |
| 2007/0121731 | A1 | 5/2007 | Tanizawa et al. |
| 2009/0190843 | A1* | 7/2009 | Jung ...................... H04N 19/43 |
| | | | 382/233 |
| 2011/0038414 | A1 | 2/2011 | Song et al. |
| 2013/0003832 | A1 | 1/2013 | Li et al. |
| 2013/0128961 | A1 | 5/2013 | Kim et al. |
| 2014/0328404 | A1 | 11/2014 | Na et al. |
| 2015/0245021 | A1* | 8/2015 | Matsuo ................ H04N 19/147 |
| | | | 375/240.02 |
| 2018/0054620 | A1 | 2/2018 | Kwon et al. |
| 2018/0249156 | A1* | 8/2018 | Heo ....................... H04N 19/70 |
| 2018/0288408 | A1* | 10/2018 | Ikai ...................... H04N 19/126 |

FOREIGN PATENT DOCUMENTS

| | | |
|---|---|---|
| EP | 2388999 A2 | 11/2011 |
| EP | 2388999 A3 | 11/2011 |
| KR | 10-2008-0067363 A | 7/2008 |
| KR | 10-2013-0067038 A | 6/2013 |
| KR | 10-2014-0059177 A | 5/2014 |
| KR | 10-2015-0091456 A | 8/2015 |

OTHER PUBLICATIONS

Planar intra prediction; Chen—2011; (Year: 2011).*
Constrained Intra Source Code Implementation; Sjoberg—2011; (Year: 2011).*
Constrained Intra prediction scheme for flexible size prediction in HEVC—2011; (Year: 2011).*
Communication dated Mar. 14, 2019, issued by the European Patent Office in counterpart European Application No. 17753488.0.
Wiegand, T., et al., "Overview of the H.264/AVC video coding standard", Jul. 1, 2003, IEEE Transactions on Circuits and Systems for Video Technology, vol. 13, No. 7, XP011221093, pp. 560-575, 17 pages total.
Raad, M., et al., "VP8 Decoder Description", Jul. 14, 2013, MPEG Meeting (Motion Picture Expert Group or ISO/IEC JTC1/SC29/WG11), No. M29689, XP03005822, 103 pages total.
Pang, C., et al., "AhG5: Constrained intra prediction for intra block copying", Oct. 24, 2013, Joint Collaborative Team on Video Coding (JCT-VC) of ITU-T SG 16 WP 3 and ISO/IEC JTC 1/SC 29/WG 11, 15th Meeting, JCTVC-O0155, XP030115175, 7 pages total.
International Search Report (PCT/ISA/210) dated May 18, 2017 issued by the International Searching Authority in International Application No. PCT/KR2017/001718.
Written Opinion (PCT/ISA/237) dated May 18, 2017 issued by the International Searching Authority in International Application No. PCT/KR2017/001718.
Matsuo, et al., "Weighted intra prediction", Oct. 2007, ITU—Telecommunications Standardization Sector, Video Coding Experts Group (VCEG), VCEG-AG18, 4 pages total, XP 030003622.
Communication dated Nov. 16, 2018, issued by the European Patent Office in counterpart European Patent Application No. 17753488.0.
Communication dated Dec. 22, 2021, issued by the State Intellectual Property Office of P.R. China in counterpart Chinese Application No. 201780011555.8.

* cited by examiner

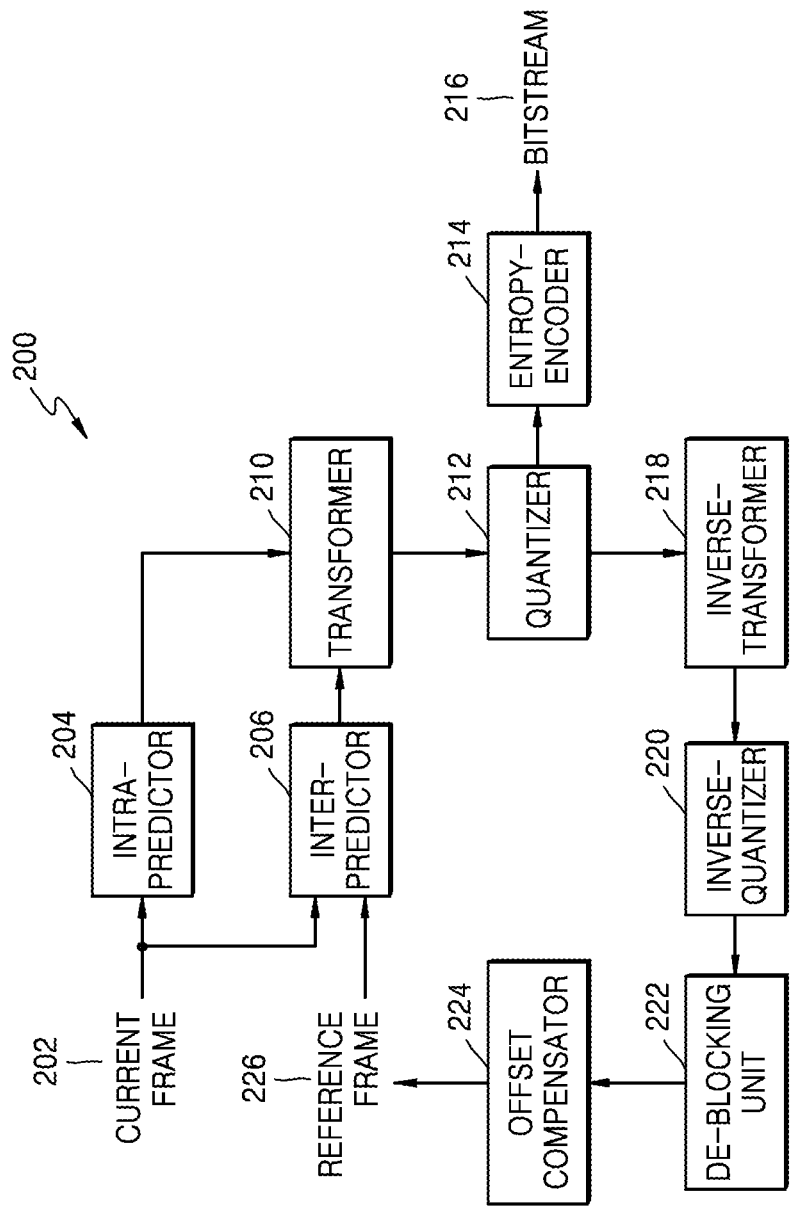

FIG. 13

| BLOCK SHAPE DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

INTRA-PREDICTION METHOD FOR REDUCING INTRA-PREDICTION ERRORS AND DEVICE FOR SAME

TECHNICAL FIELD

The present disclosure relates to an intra prediction method and apparatus that are used in encoding and decoding a video, and more particularly, to a method and apparatus for adjusting a reference sample according to a distance between a current sample and the reference sample that is referred to by the current sample in intra prediction.

BACKGROUND ART

When a video of high quality is encoded, a large amount of data is required. However, since a bandwidth allowed for transmission of the video data is limited, a data rate applied to transmission of the video data may be limited. Therefore, for efficient transmission of video data, there is a need for video data encoding and decoding methods with minimal deterioration in image quality and increased compression rates.

Video data may be compressed by removing spatial redundancy and temporal redundancy between pixels. Since adjacent pixels generally have a common characteristic, encoding information of a data unit consisting of pixels is transmitted to remove redundancy between the adjacent pixels.

Pixel values of the pixels included in the data unit are not directly transmitted but information regarding a method of obtaining the pixel values is transmitted. A prediction method of predicting a pixel value that is similar to an original value is determined for each data unit, and encoding information regarding the prediction method is transmitted from an encoder to a decoder. Since a prediction value is not completely equal to the original value, residual data of a difference between the original value and the prediction value is transmitted from the encoder to the decoder.

When prediction is exact, a data amount of the encoding information for specifying the prediction method is increased but a size of the residual data is decreased. Therefore, the prediction method is determined by taking into account sizes of the encoding information and the residual data. In particular, a data unit that is split from a picture has various sizes, and in this regard, when a size of the data unit is increased, there is an increased probability that accuracy of prediction is decreased, whereas a data amount of encoding information is decreased. Thus, a size of a block is determined according to characteristics of a picture.

The prediction method includes intra prediction and inter prediction. The intra prediction involves predicting pixels of a block from adjacent pixels of the block. The inter prediction involves predicting pixels by referring to pixels of a different picture referred to by a picture including the block. Therefore, spatial redundancy is removed through the intra prediction, and temporal redundancy is removed through the inter prediction.

When the number of prediction methods is increased, an amount of encoding information for indicating the prediction method is increased. Thus, when the encoding information to be applied to a block is predicted from a different block, the amount of the encoding information may be decreased.

Since loss of video data is allowed to the extent that the human eye cannot recognize the loss, residual data may be lossy-compressed according to transformation and quantization processes, and by doing so, an amount of the residual data may be decreased.

DESCRIPTION OF EMBODIMENTS

Technical Problem

Provided is an intra prediction method of increasing prediction accuracy with respect to a current sample by adjusting a reference sample according to a distance between the current sample and the reference sample. Provided is an intra prediction apparatus for performing the intra prediction method. In addition, provided is a computer-readable recording medium having recorded thereon a program for executing the intra prediction method on a computer.

Solution to Problem

Provided is an image predicting method including obtaining a plurality of adjacent samples located adjacent to a current block; determining an adjacent sample as a reference sample to be referred to by a current sample, the adjacent sample being from among the plurality of adjacent samples and being indicated by a direction of an intra mode of the current block; and adjusting the reference sample according to a reference distance indicating a distance between the reference sample and the current sample, and predicting the current sample according to the adjusted reference sample.

Provided is an image predicting apparatus including an adjacent sample obtainer configured to obtain a plurality of adjacent samples located adjacent to a current block; a reference sample determiner configured to determine an adjacent sample as a reference sample to be referred to by a current sample, the adjacent sample being from among the plurality of adjacent samples and being indicated by a direction of an intra mode of the current block; and a predictor configured to adjust the reference sample according to a reference distance indicating a distance between the reference sample and the current sample, and predict the current sample according to the adjusted reference sample.

The technical problems of the present disclosure are not limited to the aforementioned technical features, and other unstated technical problems may be inferred from embodiments below.

Advantageous Effects of Disclosure

Accuracy of intra prediction may be improved by adjusting a reference sample according to a distance between a current sample and the reference sample. When the accuracy of the intra prediction is improved, a prediction error that is a difference between an original image and a predicted image is decreased such that a compression rate and an image quality are improved.

BRIEF DESCRIPTION OF DRAWINGS

FIG. 2A illustrates a block diagram of an image encoder 200, according to an embodiment of the present disclosure.

FIG. 13 illustrates a process of determining a depth of a coding unit when a shape and size of the coding unit changes, in a case where a plurality of coding units are determined when the coding unit is recursively split, according to an embodiment.

BEST MODE

Figure 1A:
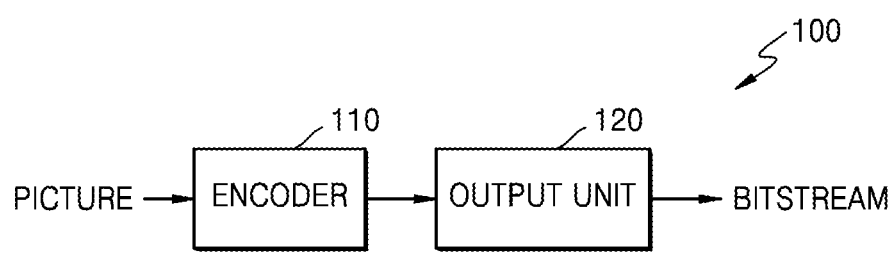
FIG. 1A illustrates a block diagram of an image encoding apparatus 100 based on coding units according to a tree structure, according to an embodiment of the present disclosure.

Provided is an image predicting method including obtaining a plurality of adjacent samples located adjacent to a current block; determining an adjacent sample as a reference sample to be referred to by a current sample, the adjacent sample being from among the plurality of adjacent samples and being indicated by a direction of an intra mode of the current block; and adjusting the reference sample according to a reference distance indicating a distance between the reference sample and the current sample, and predicting the current sample according to the adjusted reference sample.

MODE OF DISCLOSURE

Advantages and features of one or more embodiments of the present disclosure and methods of accomplishing the same may be understood more readily by reference to the following detailed description of the embodiments and the accompanying drawings. In this regard, the present disclosure may, however, be embodied in many different forms and should not be construed as being limited to the embodiments set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs specific functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, variables, or the like. A function provided by the components and "units" may be associated with the smaller number of components and "units", or may be divided into additional components and "units"

The term "current block" refers to one of a coding unit, a prediction unit, and a transform unit which are currently to be encoded or decoded. In addition, the term "lower block" refers to a data unit split from the "current block". The term "upper block" refers to a data unit including the "current block".

Hereinafter, a "sample" is data that is allocated to a sampling location of an image and is a processing target. For example, pixel values in an image of a spatial domain or transform coefficients on a transformation domain may be samples. A unit including at least one sample may be defined as a block.

The present disclosure will now be described more fully with reference to the accompanying drawings for one of ordinary skill in the art to be able to perform the present disclosure without any difficulty. In the following description, well-known functions or constructions are not described in detail so as not to obscure the embodiments with unnecessary detail.

FIG. 1A illustrates a block diagram of an image encoding apparatus 100 based on coding units according to a tree structure, according to an embodiment of the present disclosure.

The image encoding apparatus 100 includes an encoder 110 and an output unit 120.

The encoder 110 may encode an image according to a plurality of encoding methods. The encoder 110 may select a most efficient encoding method by comparing encoding results according to the plurality of encoding methods. Which encoding method is the most efficient may be determined based on rate-distortion optimization. For example, in a case where an A encoding method and a B encoding method are incompatible, the encoder 110 may encode an image according to a more efficient encoding method from among the A encoding method and the B encoding method, based on rate-distortion optimization.

The encoder 110 splits a picture or a slice included in the picture into a plurality of largest coding units, according to a size of a largest coding unit. The largest coding unit may be a data unit having a size of 32×32, 64×64, 128×128, 256×256, etc., wherein a shape of the data unit is a square having a width and length in squares of 2. The encoder 110 may provide largest coding unit size information indicating the size of the largest coding unit to the output unit 120. The output unit 120 may include the largest coding unit size information in a bitstream.

The encoder 110 determines coding units by splitting the largest coding unit. A coding unit may be determined by its largest size and depth. A depth may be defined as the number of times that the coding unit is spatially split from the largest coding unit. When the depth is increased by 1, the coding unit is split into at least two coding units. Therefore, when the depth is increased, sizes of coding units according to depths are each decreased. Whether to split a coding unit is determined according to whether splitting the coding unit is efficient according to rate-distortion optimization. Then, split information indicating whether the coding unit has been split may be generated. The split information may be expressed as a form of a flag.

The coding unit may be split by using various methods. For example, a square coding unit may be split into four square coding units of which width and height are half of those of the square coding unit. The square coding unit may be split into two rectangular coding units of which width is half. In addition, the square coding unit may be split into two rectangular coding units of which height is half. The square coding unit may be split into three coding units in a manner that a width or height thereof is split by 1:2:1.

A rectangular coding unit of which width is twice as large as a height may be split into two square coding units. The rectangular coding unit of which width is twice as large as the height may be split into two rectangular coding units of which width is four times larger than a height. The rectangular coding unit of which width is twice as large as the height may be split into two rectangular coding units and one square coding unit in a manner that the width is split by 1:2:1.

Equally, a rectangular coding unit of which height is twice as large as a width may be split into two square coding units. The rectangular coding unit of which height is twice as large as the width may be split into two rectangular coding units of which height is four times larger than a width. Equally, the rectangular coding unit of which height is twice as large as the width may be split into two rectangular coding units and one square coding unit in a manner that the height is split by 1:2:1.

When the image encoding apparatus 100 is capable of using two or more split methods, information regarding a split method that is usable to a coding unit, the split method being from among the split methods that are available to the image encoding apparatus 100, may be determined for each picture. Therefore, only specific split methods may be used for each picture. When the image encoding apparatus 100 uses only one split method, the information regarding a split method that is usable to a coding unit is not separately determined.

When split information of a coding unit indicates that the coding unit is split, split shape information indicating a split method with respect to the coding unit may be generated. When only one split method is usable in a picture including the coding unit, the split shape information may not be generated. When the split method is determined to be adaptive to encoding information adjacent to the coding unit, the split shape information may not be generated.

The largest coding unit may be split to smallest coding units according to smallest coding unit size information. A depth of the largest coding unit may be defined to be an uppermost depth, and a depth of the smallest coding units may be defined to be a lowermost depth. Therefore, a coding unit having an upper depth may include a plurality of coding units having a lower depth.

According to a largest size of a coding unit as described above, image data of a current picture is split into a largest coding unit. The largest coding unit may include coding units that are split according to depths. Since the largest coding unit is split according to the depths, image data of a spatial domain included in the largest coding unit may be hierarchically split according to the depths.

A maximum depth that limits the maximum number of hierarchically splitting the largest coding unit or a minimum size of a coding unit may be preset.

The encoder 110 compares coding efficiency of hierarchically splitting a coding unit with coding efficiency of not splitting the coding unit. Then, the encoder 110 determines whether to split the coding unit according to a result of the comparison. When the encoder 110 determines that splitting the coding unit is more efficient, the encoder 110 hierarchically splits the coding unit. However, according to the result of the comparison, when the encoder 110 determines that not splitting the coding unit is more efficient, the encoder 110 does not split the coding unit. Whether to split the coding unit may be independently determined from whether a neighboring different coding unit is split.

According to an embodiment, whether to split the coding unit may be determined from a coding unit having a large depth, during an encoding procedure. For example, coding efficiency of a coding unit having a maximum depth is compared with coding efficiency of a coding unit having a depth that is less than the maximum depth by 1, and it is determined which one of coding units having the maximum depth and coding units having the depth that is less than the maximum depth by 1 is efficiently encoded in each area of a largest coding unit. According to a result of the determination, whether to split the coding units having the depth that is less than the maximum depth by 1 is determined in each area of the largest coding unit. Afterward, it is determined which one of coding units having a depth that is less than the maximum depth by 2 and one of the coding units having the maximum depth and the coding units having the depth that is less than the maximum depth by 1, the one having been selected according to the result of the determination, are further efficiently encoded in each area of the largest coding unit. The same determination process is performed on each of coding units having a smaller depth, and finally, whether to split the largest coding unit is determined according to which one of the largest coding unit and a hierarchical structure generated by hierarchically splitting the largest coding unit is further efficiently encoded.

Whether to split the coding unit may be determined from a coding unit having a small depth, during the encoding procedure. For example, coding efficiency of the largest coding unit is compared with coding efficiency of a coding unit of which depth is greater than the largest coding unit by 1, and it is determined which one of the largest coding unit and coding units of which depth is greater than the largest coding unit by 1 is efficiently encoded. When the coding efficiency of the largest coding unit is better, the largest coding unit is not split. When coding efficiency of the coding units of which depth is greater than the largest coding unit by 1 is better, the largest coding unit is split, and the comparison process is equally applied to split coding units.

When coding efficiency is examined from a coding unit having a large depth, calculation is large but a tree structure having high coding efficiency is obtained. On the contrary, when the coding efficiency is examined from a coding unit having a small depth, calculation is small but a tree structure having low coding efficiency is obtained. Therefore, in consideration of coding efficiency and calculation, an algorithm for obtaining a hierarchical tree structure of a largest coding unit may be designed by using various methods.

To determine efficiency of a coding unit according to each depth, the encoder 110 determines prediction and transformation methods that are most efficient to the coding unit. To determine the most efficient prediction and transformation methods, the coding unit may be split into predetermined data units. A data unit may have one of various shapes according to a method of splitting the coding unit. The method of splitting the coding unit which is performed to determine the data unit may be defined as a partition mode. For example, when a coding unit of 2N×2N (where N is a positive integer) is no longer split, a size of a prediction unit included in the coding unit is 2N×2N. When the coding unit of 2N×2N is split, the size of the prediction unit included in the coding unit may be 2N×N, N×2N, or N×N, according to the partition mode. The partition mode according to the present embodiment may generate symmetrical data units obtained by symmetrically splitting a height or width of the coding unit, data units obtained by asymmetrically splitting the height or width of the coding unit, such as 1:n or n:1, data units obtained by diagonally splitting the coding unit, data units obtained by geometrically splitting the coding unit, partitions having arbitrary shapes, or the like.

The coding unit may be predicted and transformed based on a data unit included in the coding unit. However, according to the present embodiment, a data unit for prediction and a data unit for transformation may be separately determined. The data unit for prediction may be defined as a prediction unit, and the data unit for transformation may be defined as a transform unit. A partition mode applied to the prediction unit and a partition mode applied to the transform unit may be different from each other, and prediction of the prediction unit and transformation of the transform unit may be performed in a parallel and independent manner in the coding unit.

To determine an efficient prediction method, the coding unit may be split into at least one prediction unit. Equally, to determine an efficient transformation method, the coding unit may be split into at least one transform unit. The split into the prediction unit and the split into the transform unit may be independently performed from each other. However, when a reconstructed sample in the coding unit is used in intra prediction, a dependent relation is formed between prediction units or transform units included in the coding unit, so that the split into the prediction unit and the transform unit may affect each other.

The prediction unit included in the coding unit may be predicted through intra prediction or inter prediction. The intra prediction involves predicting prediction-unit samples by using reference samples adjacent to the prediction unit. The inter prediction involves predicting prediction-unit samples by obtaining reference samples from a reference picture that is referred to by a current picture.

For the intra prediction, the encoder 110 may apply a plurality of intra prediction methods to the prediction unit, thereby selecting the most efficient intra prediction method. The intra prediction method includes directional modes such as a DC mode, a planar mode, a vertical mode, a horizontal mode, or the like.

When a reconstructed sample adjacent to a coding unit is used as a reference sample, the intra prediction may be performed on each prediction unit. However, when a reconstructed sample in the coding unit is used as a reference sample, reconstruction with respect to the reference sample in the coding unit has to precede prediction with respect to a current sample, so that a prediction order of a prediction unit may depend on a transformation order of a transform unit. Therefore, when the reconstructed sample in the coding unit is used as the reference sample, only an intra prediction method for transform units corresponding to the prediction unit, and actual intra prediction may be performed on each transform unit.

The encoder 110 may select the most efficient inter prediction method by determining an optimal motion vector and reference picture. For inter prediction, the encoder 110 may determine a plurality of motion vector candidates from a coding unit that is spatially and temporally adjacent to a current coding unit, and may determine, from among them, the most efficient motion vector to be a motion vector. Equally, the encoder 110 may determine a plurality of reference picture candidates from the coding unit that is spatially and temporally adjacent to the current coding unit, and may determine the most efficient reference picture from among them. In another embodiment, the reference picture may be determined from reference picture lists that are predetermined with respect to a current picture. In another embodiment, for accuracy of prediction, the most efficient motion vector from among the plurality of motion vector candidates may be determined to be a prediction motion vector, and a motion vector may be determined by compensating for the prediction motion vector. The inter prediction may be performed in parallel on each prediction unit in the coding unit.

The encoder 110 may reconstruct the coding unit by obtaining only information indicating the motion vector and the reference picture, according to a skip mode. According to the skip mode, all encoding information including a residual signal is skipped, except for the information indicating the motion vector and the reference picture. Since the residual signal is skipped, the skip mode may be used when accuracy of prediction is very high.

A partition mode to be used may be limited according to the prediction method for the prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. The image encoding apparatus 100 may change a partition mode for each prediction method, according to coding efficiency.

The image encoding apparatus 100 may perform transformation based on a coding unit or a transform unit included in the coding unit. The image encoding apparatus 100 may transform residual data that is a difference value between an original value and a prediction value with respect to pixels included in the coding unit. For example, the image encoding apparatus 100 may perform lossy-compression on the residual data through quantization and discrete cosine transform (DCT)/discrete sine transform (DST). Alternatively, the image encoding apparatus 100 may perform lossless-compression on the residual data without the quantization.

The image encoding apparatus 100 may determine a transform unit that is the most efficient one for quantization and transformation. The transform unit in the coding unit may be recursively split into smaller sized regions in a manner similar to that in which the coding unit is split according to the tree structure, according to an embodiment. Thus, residual data in the coding unit may be split according to the transform unit having the tree structure according to transformation depths. The image encoding apparatus 100 may generate transformation split information regarding splitting the coding unit and the transform unit according to the determined tree structure of the transform unit.

A transformation depth indicating the number of splitting times to reach the transform unit by splitting the height and width of the coding unit may also be set in the image encoding apparatus 100. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, the transform unit according to the tree structure may be set according to the transformation depth.

In conclusion, the encoder 110 determines a prediction method that is the most efficient one for a current prediction unit and is from among a plurality of intra prediction methods and inter prediction methods. Then, the encoder 110 determines a prediction unit determination scheme according to coding efficiency according to a prediction result. Equally, the encoder 110 determines a transform unit determination scheme according to coding efficiency according to a transformation result. According to the most efficient prediction unit and transform unit determination scheme, coding efficiency of a coding unit is finally determined. The encoder 110 finalizes a hierarchical structure of a largest coding unit, according to coding efficiency of a coding unit according to each depth.

The encoder 110 may measure coding efficiency of coding units according to depths, prediction efficiency of prediction methods, or the like by using rate-distortion optimization based on Lagrangian multipliers.

The encoder 110 may generate split information indicating whether to split a coding unit according to each depth according to the determined hierarchical structure of the largest coding unit. Then, the encoder 110 may generate, for split coding units, partition mode information to be used in determining a prediction unit and transform unit split information to be used in determining a transform unit. In addition, when the coding unit may be split by using at least two split methods, the encoder 110 may generate both split information and split shape information that indicates a split method. The encoder 110 may generate information regarding the prediction method and the transformation method that are used in the prediction unit and the transform unit.

The output unit 120 may output, in a bitstream, a plurality of pieces of information generated by the encoder 110 according to the hierarchical structure of the largest coding unit.

A method of determining the coding unit, the prediction unit, and the transform unit according to the tree structure of the largest coding unit will be described below with reference to FIGS. 3 to 12.

Figure 1B:
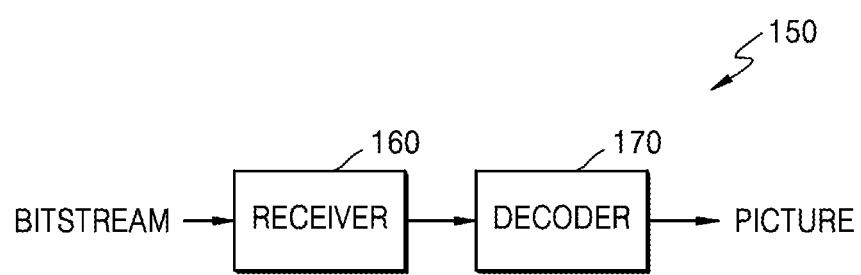
FIG. 1B illustrates a block diagram of an image decoding apparatus 150 based on coding units according to a tree structure, according to an embodiment.

FIG. 1B illustrates a block diagram of an image decoding apparatus 150 based on coding units according to a tree structure, according to an embodiment.

The image decoding apparatus 150 includes a receiver 160 and a decoder 170.

Definitions of the terms including a coding unit, a depth, a prediction unit, a transform unit, various split information, or the like for a decoding operation performed by the image decoding apparatus 150 are equal to those described above with reference to FIG. 1A and the image encoding apparatus 100. Because the image decoding apparatus 150 is designed to reconstruct image data, various encoding methods used by the image encoding apparatus 100 may also be applied to the image decoding apparatus 150.

The receiver 160 receives and parses a bitstream regarding an encoded video. The decoder 170 extracts, from the parsed bitstream, a plurality of pieces of information to be used in decoding largest coding units. The decoder 170 may extract information regarding a largest size of a coding unit of a current picture from a header, a sequence parameter set, or a picture parameter set of the current picture.

Also, the decoder 170 extracts, from the parsed bitstream, a final depth and split information regarding coding units according to a tree structure according to each largest coding unit. The decoder 170 may split a largest coding unit according to the extracted final depth and split information, thereby determining a tree structure of the largest coding unit.

The split information extracted by the decoder 170 is split information regarding the tree structure determined to generate a minimum encoding error, the determination being performed by the image encoding apparatus 100. Therefore, the image decoding apparatus 150 may reconstruct an image by decoding data according to a decoding scheme that generates the minimum encoding error.

The decoder 170 may extract split information regarding a data unit such as a prediction unit and a transform unit included in the coding unit. For example, the decoder 170 may extract partition mode information regarding a partition mode that is the most efficient one for the prediction unit. The decoder 170 may extract transformation split information regarding a tree structure that is the most efficient one for the transform unit.

Also, the decoder 170 may obtain information regarding the most efficient prediction method with respect to prediction units split from the coding unit. Then, the decoder 170 may obtain information regarding the most efficient transformation method with respect to transform units split from the coding unit.

The decoder 170 extracts the information from the bitstream, according to a method of configuring the bitstream, the method being performed by the output unit 120 of the image encoding apparatus 100.

The decoder 170 may split a largest coding unit into coding units having the most efficient tree structure, based on the split information. Then, the decoder 170 may split the coding unit into the prediction units according to the partition mode information. The decoder 170 may split the coding unit into the transform units according to the transformation split information.

The decoder 170 may predict the prediction units according to the information regarding the prediction method. The decoder 170 may perform inverse quantization and inverse transformation on residual data that is a difference between an original value and a prediction value of a pixel, according to information regarding a method of transforming a transform unit. Also, the decoder 170 may reconstruct pixels of the coding unit, according to a result of the prediction on the prediction units and a result of the transformation on the transform units.

FIG. 2A illustrates a block diagram of an image encoder 200 based on coding units, according to various embodiments.

The image encoder 200 according to an embodiment performs operations for the encoder 110 of the image encoding apparatus 100 to encode image data. That is, an intra-predictor 204 performs intra prediction on a coding unit of an intra mode in a current frame 202, and an inter-predictor 206 performs inter prediction by using the current frame 202 and a reference frame 226 of an inter mode.

Prediction error data determined according to prediction performed by the intra-predictor 204 or the inter-predictor 206 is output as a quantized transform coefficient through a transformer 210 and a quantizer 212. The quantized transform coefficient is reconstructed as prediction error data of a spatial domain through an inverse-transformer 218 and an inverse-quantizer 220, and the reconstructed prediction error data of the spatial domain is post-processed through a de-blocking unit 222 and an offset adjuster 224. The post-processed prediction error data is combined with prediction data obtained by the intra-predictor 204 or the inter-predictor 206, such that the reference frame 226 is generated. The quantized transform coefficient may pass through an entropy-encoder 214 and may be output as a bitstream 216.

The intra-predictor 204, the inter-predictor 206, the transformer 210, the quantizer 212, the entropy-encoder 214, the inverse-transformer 218, the inverse-quantizer 220, the de-blocking unit 222, and the offset adjuster 224, which are elements of the image encoder 200, are performed on each of coding units according to a tree structure of an image.

In particular, the intra-predictor 204 and the inter-predictor 206 determine a partition and a prediction mode of each of the coding units according to a tree structure by considering a largest size and a maximum depth of a current largest coding unit, and the transformer 210 determines a size of a transform unit in each of the coding units according to a tree structure.

Figure 2B:
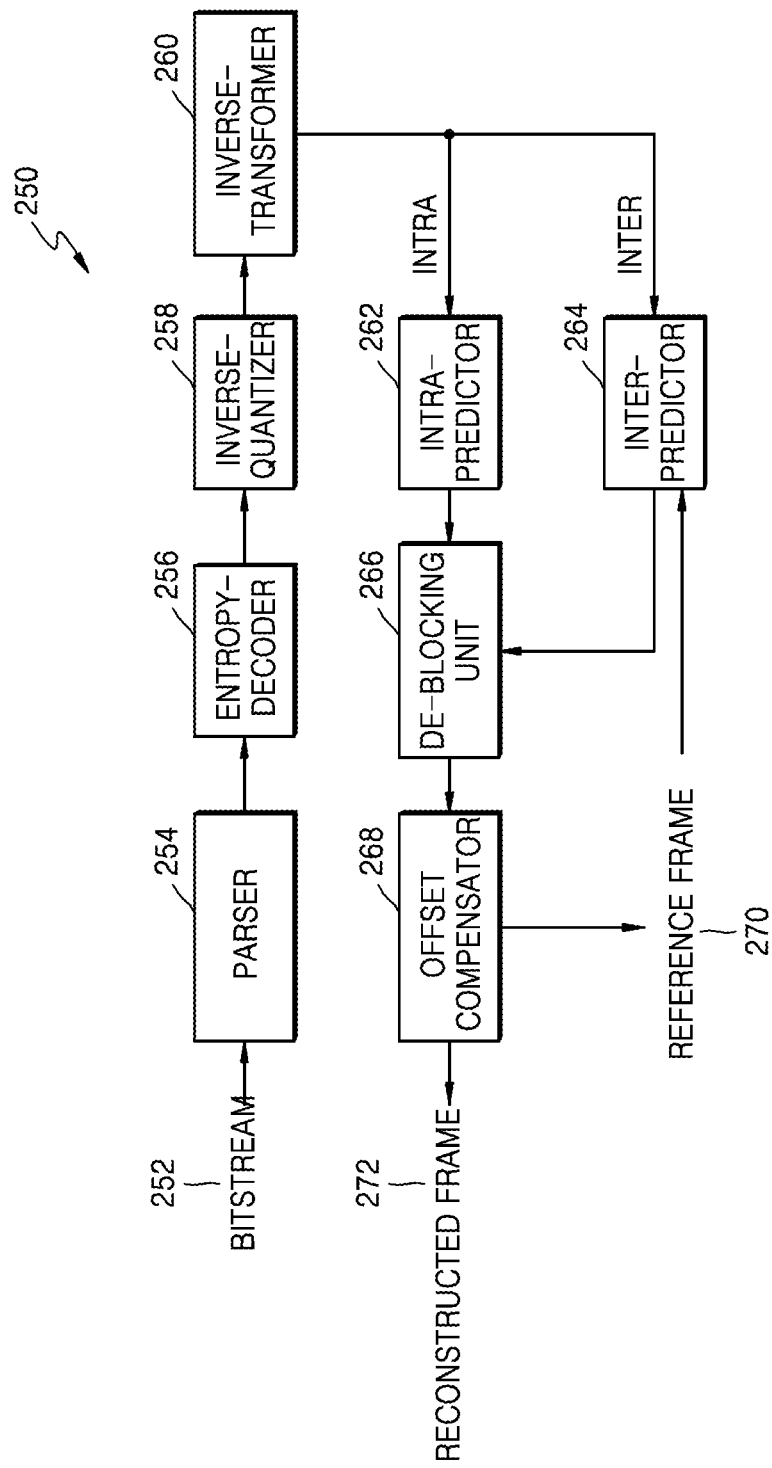
FIG. 2B illustrates a block diagram of an image decoder 250, according to an embodiment.

FIG. 2B illustrates a block diagram of an image decoder 250 based on coding units, according to various embodiments.

A bitstream 252 passes through a parser 254 and then encoded image data that is a decoding target and encoding information required for decoding are parsed. The encoded image data passes through an entropy-decoder 256 and an inverse-quantizer 258 and then is output as quantized data, and the quantized data passes through an inverse-transformer 260 and then prediction error data of a spatial domain is reconstructed.

With respect to the prediction error data of the spatial domain, an intra-predictor 262 performs intra prediction on a coding unit of an intra mode, and an inter-predictor 262 performs inter prediction on a coding unit of an inter mode by using a reference frame 270.

Prediction data predicted by the intra-predictor 262 and the inter-predictor 264 is post-processed through a de-blocking unit 266 and an offset compensator 268. The post-processed prediction data and the prediction error data are combined such that a reconstructed frame 272 may be generated.

In order for the decoder 170 of the image decoding apparatus 150 to decode image data, operations may be sequentially performed from the parser 254 of the image decoder 250 according to an embodiment.

The parser 254, the entropy-decoder 256, the inverse-quantizer 258, the inverse-transformer 260, the intra-predictor 262, the inter-predictor 264, the blocking unit 266, and the offset compensator 268, which are elements of the image decoding apparatus 150, are performed on each of coding units according to a tree structure of an image.

In particular, the intra-predictor 262 and the inter-predictor 264 determine a partition and a prediction mode of each of the coding units according to a tree structure, and the inverse-transformer 260 determines a size of a transform unit in each of the coding units.

Figure 3:
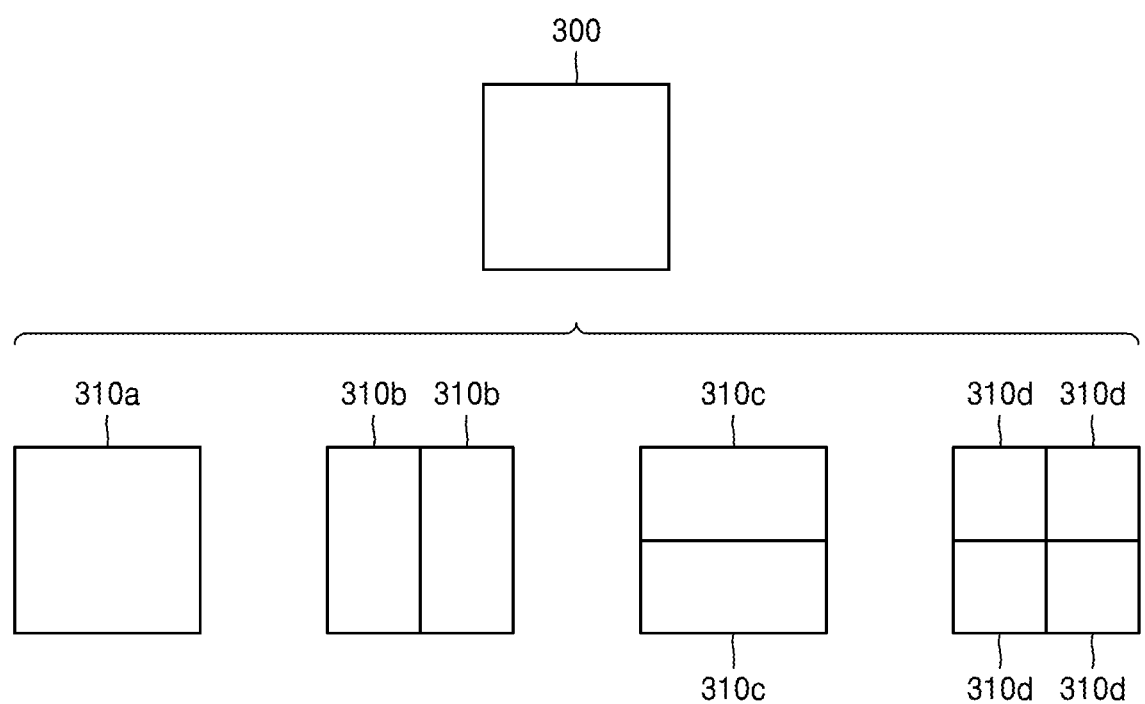
FIG. 3 illustrates a process of determining at least one coding unit by splitting a current coding unit according to an embodiment.

FIG. 3 illustrates a process of determining at least one coding unit when the image decoding apparatus 150 splits a current coding unit, according to an embodiment.

According to the present embodiment, the image decoding apparatus 150 may determine, by using block shape information, a shape of a coding unit, and may determine, by using split shape information, a shape according to which the coding unit is to be split. That is, a method of splitting a coding unit, which is indicated by the split shape information, may be determined based on which block shape is indicated by the block shape information used by the image decoding apparatus 150.

According to the present embodiment, the image decoding apparatus 150 may use the block shape information indicating that a current coding unit has a square shape. For example, the image decoding apparatus 150 may determine whether to split a square coding unit or not, whether to split the square coding unit vertically, whether to split the square coding unit horizontally, or whether to split the square coding unit into four coding units, according to the split shape information. Referring to FIG. 3, when block shape information of a current coding unit 300 indicates a square shape, the decoder 170 may not split a coding unit 310a having the same size as the current coding unit 300 according to split shape information indicating no split, or may determine coding units 310b, 310c, and 310d split based on split shape information indicating a predetermined split method.

Referring to FIG. 3, the image decoding apparatus 150 may determine the two coding units 310b obtained by splitting the current coding unit 300 in a vertical direction based on split shape information indicating split in a vertical direction, according to an embodiment. The image decoding apparatus 150 may determine the two coding units 310c obtained by splitting the current coding unit 300 in a horizontal direction based on split shape information indicating split in a horizontal direction. The image decoding apparatus 150 may determine the four coding units 310d obtained by splitting the current coding unit 300 in vertical and horizontal directions based on split shape information indicating split in vertical and horizontal directions. However, a split shape for splitting a square coding unit may not be limitedly interpreted to above shapes, and may include various shapes indicatable by split shape information. Predetermined split shapes for splitting a square coding unit will be described in detail below through various embodiments.

Figure 4:
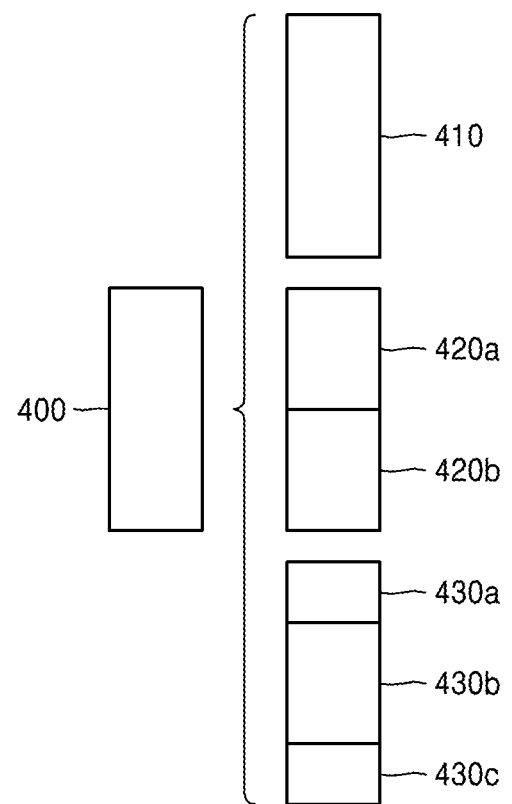
FIG. 4 illustrates a process of determining at least one coding unit when a coding unit having a non-square shape is split, according to an embodiment.
Figure 4:
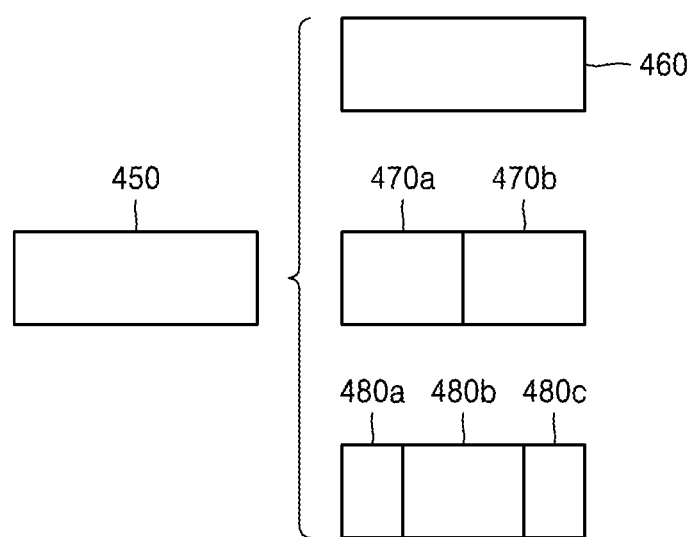

FIG. 4 illustrates a process of determining at least one coding unit when the image decoding apparatus 150 splits a coding unit having non-square shape, according to an embodiment.

According to the present embodiment, the image decoding apparatus 150 may use block shape information indicating that a current coding unit has a non-square shape. The image decoding apparatus 150 may determine whether or not to split the current coding unit having the non-square shape, or whether to split the current coding unit having the non-square shape by using a predetermined method. Referring to FIG. 4, when block shape information of a current coding unit 400 or 450 indicates a non-square shape, the image decoding apparatus 150 may not split a coding unit 410 or 460 having the same size as the current coding unit 400 or 450 according to split shape information indicating no split, or may determine coding units 420a, 420b, 430a, 430b, 430c, 470a, 470b, 480a, 480b, and 480c split according to split shape information indicating a predetermined split method. A predetermined split method of splitting a non-square coding unit will be described in detail below through various embodiments.

According to the present embodiment, the image decoding apparatus 150 may determine, by using the split shape information, a shape of a coding unit is split, and in this case, the split shape information may indicate the number of at least one coding unit generated when a coding unit is split. Referring to FIG. 4, when the split shape information indicates that the current coding unit 400 or 450 is split into two coding units, the image decoding apparatus 150 may determine the two coding units 420a and 420b or 470a and 470b, which are respectively included in the current coding unit 400 or 450 by splitting the current coding unit 400 or 450 based on the split shape information.

According to the present embodiment, when the image decoding apparatus 150 splits the current coding unit 400 or 450 having the non-square shape based on the split shape information, the image decoding apparatus 150 may split the current coding unit 400 or 450 having the non-square shape in consideration of a location of a longer side. For example, the image decoding apparatus 150 may determine a plurality of coding units by splitting the current coding unit 400 or 450 in a direction of splitting the longer sides of the current coding unit 400 or 450 in consideration of the shape of the current coding unit 400 or 450.

According to the present embodiment, when split shape information indicates that a coding unit is split into an odd number of blocks, the image decoding apparatus 150 may determine an odd number of coding units included in the current coding unit 400 or 450. For example, when split shape information indicates that the current coding unit 400 or 450 is split into three coding units, the image decoding apparatus 150 may split the current coding unit 400 or 450 into the three coding units 430a, 430b, 430c, 480a, 480b, and 480c. According to the present embodiment, the image decoding apparatus 150 may determine the odd number of coding units included in the current coding unit 400 or 450, wherein sizes of the determined coding units are not the same. For example, a size of the coding unit 430b or 480b from among the odd number of coding units 430a, 430b, 430c, 480a, 480b, and 480c may be different from sizes of the coding units 430a, 430c, 480a, and 480c. That is, coding units that may be determined when the current coding unit 400 or 450 is split may have different types of sizes.

According to the present embodiment, when split shape information indicates that a coding unit is split into an odd number of blocks, the image decoding apparatus 150 may determine an odd number of coding units included in the current coding unit 400 or 450 and in addition, set a predetermined limit on at least one coding unit from among the odd number of coding units generated by splitting the current coding unit 400 or 450. Referring to FIG. 4, the image decoding apparatus 150 may decode the coding unit 430b or 480b at the center of the three coding units 430a, 430b, and 430c, or 480a, 480b, and 480c generated when the current coding unit 400 or 450 is split in a different manner from the coding units 430a and 430c or 480a and 480c. For example, the image decoding apparatus 150 may limit the coding unit 430b or 480b at the center not to be further split unlike the coding units 430a and 430c or 480a and 480c, or to be split only a certain number of times.

Figure 5:
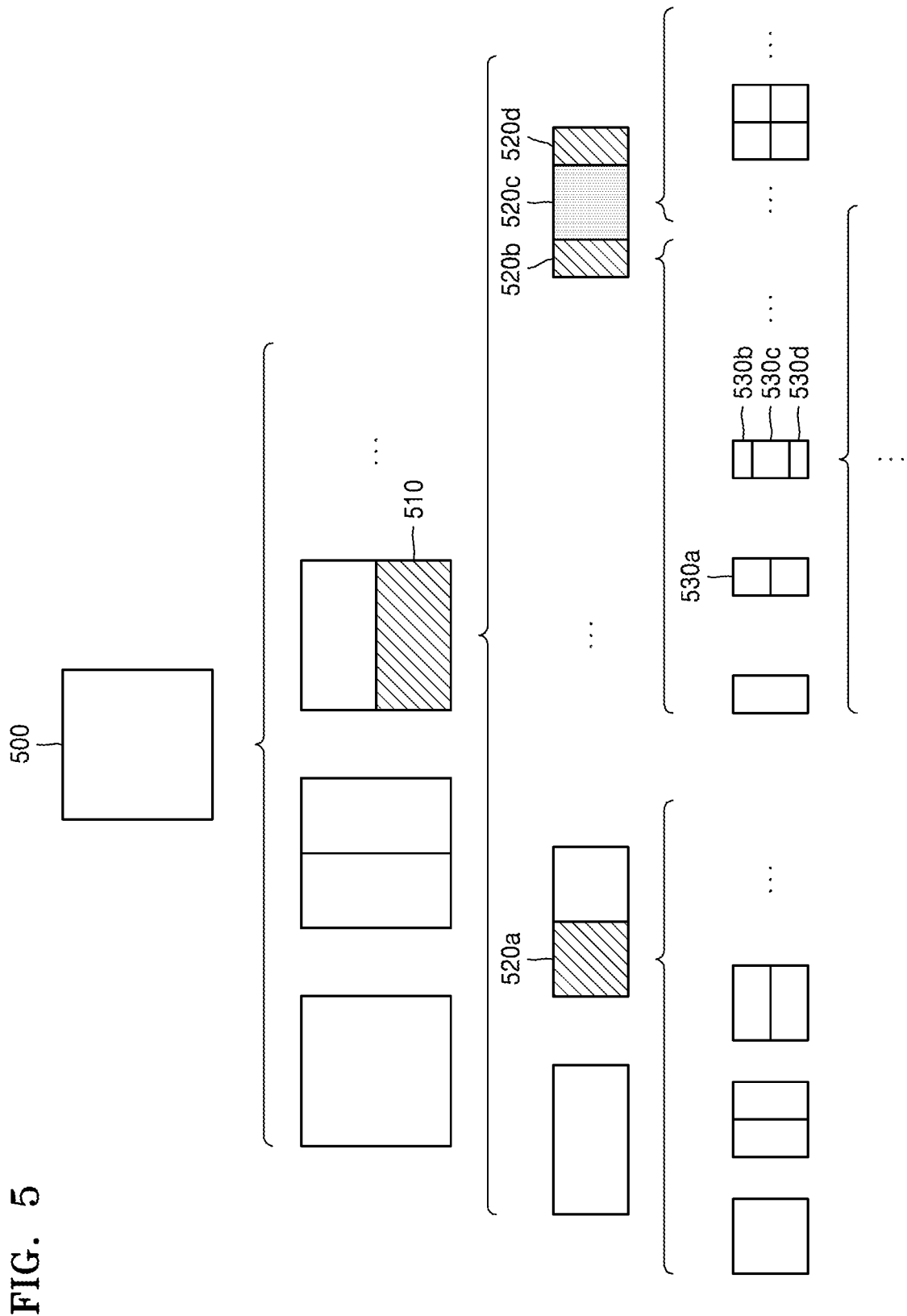
FIG. 5 illustrates a process of splitting a coding unit based on at least one of block shape information and split shape information, according to an embodiment.

FIG. 5 illustrates a process of splitting, by the image decoding apparatus 150, a coding unit based on at least one of block shape information and split shape information, according to an embodiment.

According to the present embodiment, the image decoding apparatus 150 may determine whether to split a first coding unit 500 having a square shape into coding units based on at least one of block shape information and split shape information. According to the present embodiment, when the split shape information indicates splitting of the first coding unit 500 in a horizontal direction, the image decoding apparatus 150 may determine a second coding unit 510 by splitting the first coding unit 500 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to the embodiment, the image decoding apparatus 150 may determine whether to split the determined second coding unit 510 into coding units based on at least one of block shape information and split shape information. Referring to FIG. 5, the image decoding apparatus 150 may split the second coding unit 510, which has a non-square shape determined by splitting the first coding unit 500, into at least one third coding unit, for example, third coding units 520*a*, 520*b*, 520*c*, and 520*d*, based on at least one of block shape information and split shape information, or may not split the second coding unit 510. The image decoding apparatus 150 may obtain at least one of block shape information and split shape information, the image decoding apparatus 150 may split the first coding unit 500 based on at least one of the block shape information and the split shape information to obtain a plurality of second coding units (for example, the second coding unit 510) having various shapes, and the second coding unit 510 may be split according to a manner of splitting the first coding unit 500 based on at least one of the block shape information and the split shape information. According to the present embodiment, when the first coding unit 500 is split into the second coding units 510 based on at least one of block shape information and split shape information about the first coding unit 500, the second coding unit 510 may also be split into the third coding units, for example, the third coding units 520*a*, 520*b*, 520*c*, and 520*d*, based on at least one of block shape information and split shape information about the second coding unit 510. That is, a coding unit may be recursively split based on at least one of split shape information and block shape information related to the coding unit. A method used to recursively split a coding unit will be described below through various embodiments.

According to the present embodiment, the image decoding apparatus 150 may determine to split each of the third coding units (for example, the third coding units 520*a*, 520*b*, 520*c*, and 520*d*) into coding units or not to split the second coding unit 510 based on at least one of block shape information and split shape information. The image decoding apparatus 150 may split the second coding unit 510 having a non-square shape into the odd number of third coding units 520*b*, 520*c*, and 520*d*. The image decoding apparatus 150 may set a predetermined limitation on a predetermined third coding unit from among the odd number of third coding units 520*b*, 520*c*, and 520*d*. For example, the image decoding apparatus 150 may limit the coding unit 520*c* located at the center from among the odd number of third coding units 520*b*, 520*c*, and 520*d* to be split no more or to be split to a settable number of times. Referring to FIG. 5, the image decoding apparatus 150 may limit the coding unit 520*c* located at the center from among the odd number of third coding units 520*b*, 520*c*, and 520*d* included in the second coding unit 510 having a non-square shape to be split no more, to be split into a predetermined split manner (for example, split only into four coding units or split into a shape corresponding to that into which the second coding unit 510 is split), or to be split only a predetermined number of times (for example, split only n times, wherein n>0). However, the limitations on the coding unit 520*c* located at the center are simply embodiments, and thus the present disclosure should not be interpreted limitedly to the above embodiments, and it should be interpreted that the limitations include various limitations of decoding the coding unit 520*c* located at the center differently from the coding units 520*b* and 520*d*.

Figure 6:
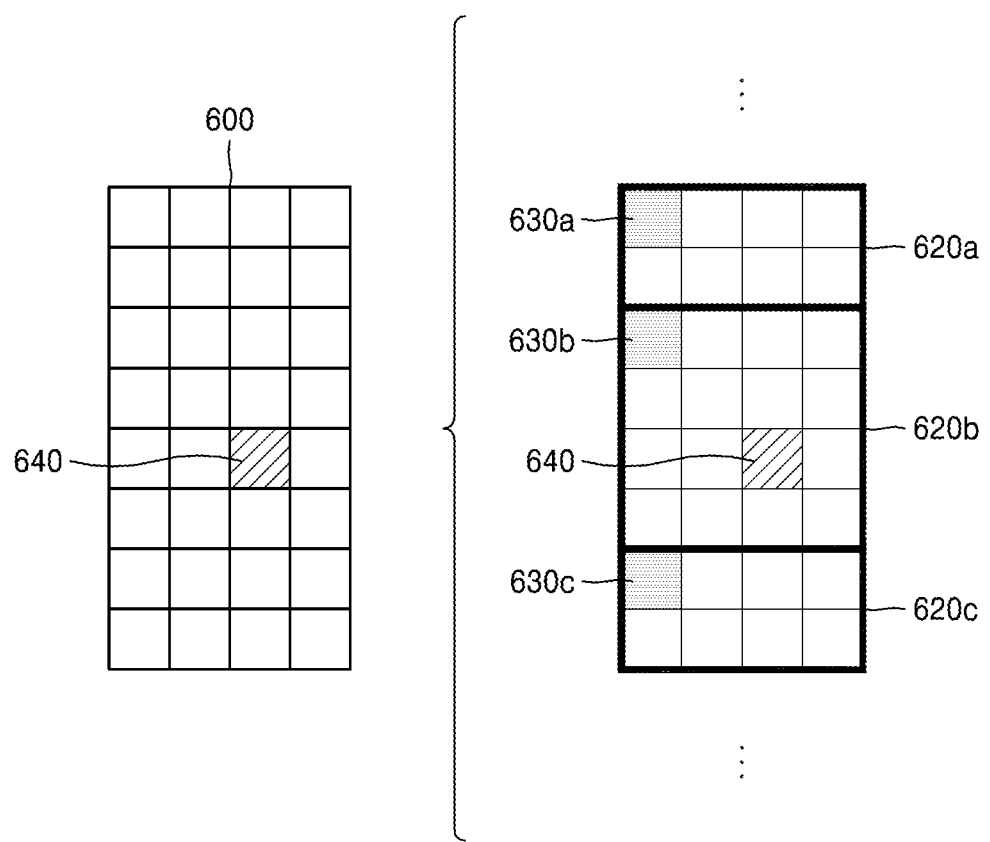
FIG. 6 illustrates a method of determining a predetermined coding unit from among an odd number of coding units, according to an embodiment.

FIG. 6 illustrates a method of determining, by the image decoding apparatus 150, a coding unit at a predetermined location from among an odd number of coding units, according to an embodiment.

According to the present embodiment, the image decoding apparatus 150 may use information indicating a location of each of an odd number of coding units so as to determine a coding unit located at the center of the odd number of coding units. Referring to FIG. 6, the image decoding apparatus 150 may determine an odd number of coding units 620*a*, 620*b*, and 620*c* by splitting a current coding unit 600. The image decoding apparatus 150 may determine the coding unit 620*b* at the center by using information about locations of the odd number of coding units 620*a*, 620*b*, and 620*c*. For example, the image decoding apparatus 150 may determine the coding unit 620*b* located at the center by determining locations of the coding units 620*a*, 620*b*, and 620*c* based on information indicating locations of predetermined samples included in the coding units 620*a*, 620*b*, and 620*c*. In detail, the image decoding apparatus 150 may determine the coding unit 620*b* located at the center by determining the locations of the coding units 620*a*, 620*b*, and 620*c* based on information indicating locations of upper left samples 630*a*, 630*b*, and 630*c* of the coding units 620*a*, 620*b*, and 620*c*.

According to the present embodiment, the information indicating the locations of the upper left samples 630*a*, 630*b*, and 630*c* respectively included in the coding units 620*a*, 620*b*, and 620*c* may include information about locations or coordinates in a picture of the coding units 620*a*, 620*b*, and 620*c*. According to the present embodiment, the information indicating the locations of the upper left samples 630*a*, 630*b*, and 630*c* respectively included in the coding units 620*a*, 620*b*, and 620*c* may include information indicating widths or heights of the coding units 620*a*, 620*b*, and 620*c* included in the current coding unit 600, wherein the widths or heights may correspond to information indicating differences between coordinates in the picture of the coding units 620*a*, 620*b*, and 620*c*. That is, the image decoding apparatus 150 may determine the coding unit 620*b* located at the center by directly using the information about the locations or coordinates in the picture of the coding units 620*a*, 620*b*, and 620*c*, or by using the information about the widths or heights of the coding units, which indicate difference values between coordinates.

According to the present embodiment, the information indicating the location of the upper left sample 630*a* of the top coding unit 620*a* may indicate (xa, ya) coordinates, information indicating the location of the upper left sample 630*b* of the center coding unit 620*b* may indicate (xb, yb) coordinates, and the information indicating the location of the upper left sample 630*c* of the bottom coding unit 620*c* may indicate (xc, yc) coordinates. The image decoding apparatus 150 may determine the center coding unit 620*b* by using the coordinates of the upper left samples 630*a*, 630*b*, and 630*c* respectively included in the coding units 620*a*, 620*b*, and 620*c*. For example, when the coordinates of the upper left samples 630*a*, 630*b*, and 630*c* are aligned in an ascending order or descending order, the center coding unit 620*b* including (xb, yb) that is coordinates of the upper left sample 630*b* may be determined as a coding unit located at the center from among the coding units 620*a*, 620*b*, and 620*c* determined when the current coding unit 600 is split. Here, the coordinates indicating the locations of the upper left samples 630*a*, 630*b*, and 630*c* may indicate coordinates indicating absolute locations in the picture, and further, may use (dxb, dyb) coordinates that are information indicating a relative location of the upper left sample 630*b* of the center coding unit 620*b* and (dxc, dyc) coordinates that are information indicating a relative location of the upper left sample 630*c* of the bottom coding unit 620*c*, based on the location of the upper left sample 630*c* of the top coding unit 620*a*. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to the embodiment, the image decoding apparatus 150 may split the current coding unit 600 into the plurality of coding units 620*a*, 620*b*, and 620*c*, and select a coding unit from among the coding units 620*a*, 620*b*, and 620*c* according to a predetermined criterion. For example, the image decoding apparatus 150 may select the coding unit 620*b* that has a different size from among the coding units 620*a*, 620*b*, and 620*c*.

According to the present embodiment, the image decoding apparatus 150 may determine the width or height of each of the coding units 620*a*, 620*b*, and 620*c* by using the (xa, ya) coordinates that are the information indicating the location of the upper left sample 630*a* of the top coding unit 620*a*, the (xb, yb) coordinates that are the information indicating the location of the upper left sample 630*b* of the center coding unit 620*b*, and the (xc, yc) coordinates that are the information indicating the location of the upper left sample 630*c* of the bottom coding unit 620*c*. The image decoding apparatus 150 may determine a size of each of the coding units 620*a*, 620*b*, and 620*c* by using the coordinates (xa, ya), (xb, yb), and (xc, yc) indicating the locations of the coding units 620*a*, 620*b*, and 620*c*.

According to an embodiment, the image decoding apparatus 150 may determine the width of the top coding unit 620*a* to xb−xa and the height to yb−ya. According to the embodiment, the image decoding apparatus 150 may determine the width of the center coding unit 620*b* to xc−xb and the height to yc−yb. According to the present embodiment, the image decoding apparatus 150 may determine the width or height of the bottom coding unit by using the width or height of the current coding unit, and the width and height of the top coding unit 620*a* and the center coding unit 620*b*. The image decoding apparatus 150 may determine one coding unit having a size different from other coding units based on the determined widths and heights of the coding units 620*a*, 620*b*, and 620*c*. Referring to FIG. 5, the image decoding apparatus 150 may determine, as the coding unit at the predetermined location, the center coding unit 620*b* having a size different from sizes of the top coding unit 620*a* and the bottom coding unit 620*c*. However, since a process of determining, by the image decoding apparatus 150, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to the embodiment, the image decoding apparatus 150 may select a coding unit at a predetermined location from among an odd number of coding units that are determined when a current coding unit is split, in consideration of a shape of the current coding unit. For example, when the current coding unit has a non-square shape in which a width is longer than a height, the image decoding apparatus 150 may determine the coding unit at the predetermined location along a horizontal direction. In other words, the image decoding apparatus 150 may determine a coding unit from among coding units having different locations in the horizontal direction, and may set a limitation on the coding unit. When the current coding unit has the non-square shape in which the height is longer than the width, the image decoding apparatus 150 may determine the coding unit at the predetermined location along a vertical direction. In other words, the image decoding apparatus 150 may determine a coding unit from among coding units having different locations in the vertical direction, and set a limitation on the coding unit.

According to the present embodiment, the image decoding apparatus 150 may use information indicating a location of each of an even number of coding units so as to determine a coding unit at a predetermined location from among the even number of coding units. The image decoding apparatus 150 may determine the even number of coding units by splitting a current coding unit, and determine the coding unit at the predetermined location by using the information about the locations of the even number of coding units. Detailed processes thereof may correspond to processes of determining a coding unit at a predetermined location (for example, a center location) from among an odd number of coding units, which have been described above with reference to FIG. 6, and thus descriptions thereof are not provided again.

According to the present embodiment, when a current coding unit having a non-square shape is split into a plurality of coding units, predetermined information about a coding unit at a predetermined location may be used during a split process so as to determine the coding unit at the predetermined location from among the plurality of coding units. For example, the image decoding apparatus 150 may use at least one of block shape information and split shape information, which are stored in a sample included in a center coding unit during a split process so as to determine a coding unit located at the center from among a plurality of coding units obtained by splitting a current coding unit.

Referring to FIG. 5, the image decoding apparatus 150 may split the current coding unit 600 into the plurality of coding units 620*a*, 620*b*, and 620*c* based on at least one of block shape information and split shape information, and determine the coding unit 620*b* located at the center from among the plurality of coding units 620*a*, 620*b*, and 620*c*. In addition, the image decoding apparatus 150 may determine the coding unit 620*b* located at the center in consideration of a location where at least one of the block shape information and the split shape information is obtained. That is, at least one of the block shape information and the split shape information of the current coding unit 600 may be obtained from the sample 640 located at the center of the current coding unit 600, and when the current coding unit 600 is split into the plurality of coding units 620*a*, 620*b*, and 620*c* based on at least one of the block shape information and the split shape information, the coding unit 620*b* including the sample 640 may be determined as the coding unit located at the center. However, information used to determine a coding unit located at the center should not be limitedly interpreted to at least one of block shape information and split shape information, and various types of information may be used during a process of determining a coding unit located at the center.

According to the present embodiment, predetermined information for identifying a coding unit at a predetermined location may be obtained from a predetermined sample included in a coding unit to be determined. Referring to FIG. 6, the image decoding apparatus 150 may use at least one of block shape information and split shape information obtained from a sample located at a predetermined location in the current coding unit 600 (for example, a sample located at the center of the current coding unit 600) so as to determine a coding unit at a predetermined location from among the plurality of coding units 620a, 620b, and 620c determined when the current coding unit 600 is split (for example, a coding unit located at the center from among the plurality of coding units). That is, the image decoding apparatus 150 may determine the sample at the predetermined location in consideration of a block shape of the current coding unit 600, and the image decoding apparatus 150 may determine and set a predetermined limitation on the coding unit 620b including the sample from which predetermined location (for example, at least one of the block shape information and the split shape information) is obtained, from among the plurality of coding units 620a, 620b, and 620c determined when the current coding unit 600 is split. Referring to FIG. 6, the image decoding apparatus 150 may determine the sample 640 located at the center of the current coding unit 600, as the sample from which the predetermined information is obtained, and the image decoding apparatus 150 may set the predetermined location during a decoding process, on the coding unit 620b including the sample 640. However, a location of a sample from which predetermined information is obtained should not be limitedly interpreted to the above location, and the sample may be interpreted to samples at arbitrary locations included in the coding unit 620 determined to be limited.

According to the present embodiment, a location of a sample from which predetermined location is obtained may be determined based on a shape of the current coding unit 600. According to the present embodiment, block shape information may be used to determine whether a shape of a current coding unit is a square or a non-square, and a location of a sample from which predetermined information is obtained may be determined based on the shape. For example, the image decoding apparatus 150 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding apparatus 150 may determine, as a sample from which predetermined information is obtained, one of samples adjacent to a boundary of splitting a longer side of the current coding unit into halves.

According to the present embodiment, when a current coding unit is split into a plurality of coding units, the image decoding apparatus 150 may use at least one of block shape information and split shape information so as to determine a coding unit at a predetermined location from among the plurality of coding units. According to an embodiment, the image decoding apparatus 150 may obtain at least one of the block shape information and the split shape information from a sample at a predetermined location included in the coding unit, and the image decoding apparatus 150 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Since a recursive split process of a coding unit has been described above with reference to FIG. 4, details thereof are not provided again.

According to the present embodiment, the image decoding apparatus 150 may determine at least one coding unit by splitting a current coding unit, and determine an order of decoding the at least one coding unit according to a predetermined block (for example, a current coding unit).

Figure 7:
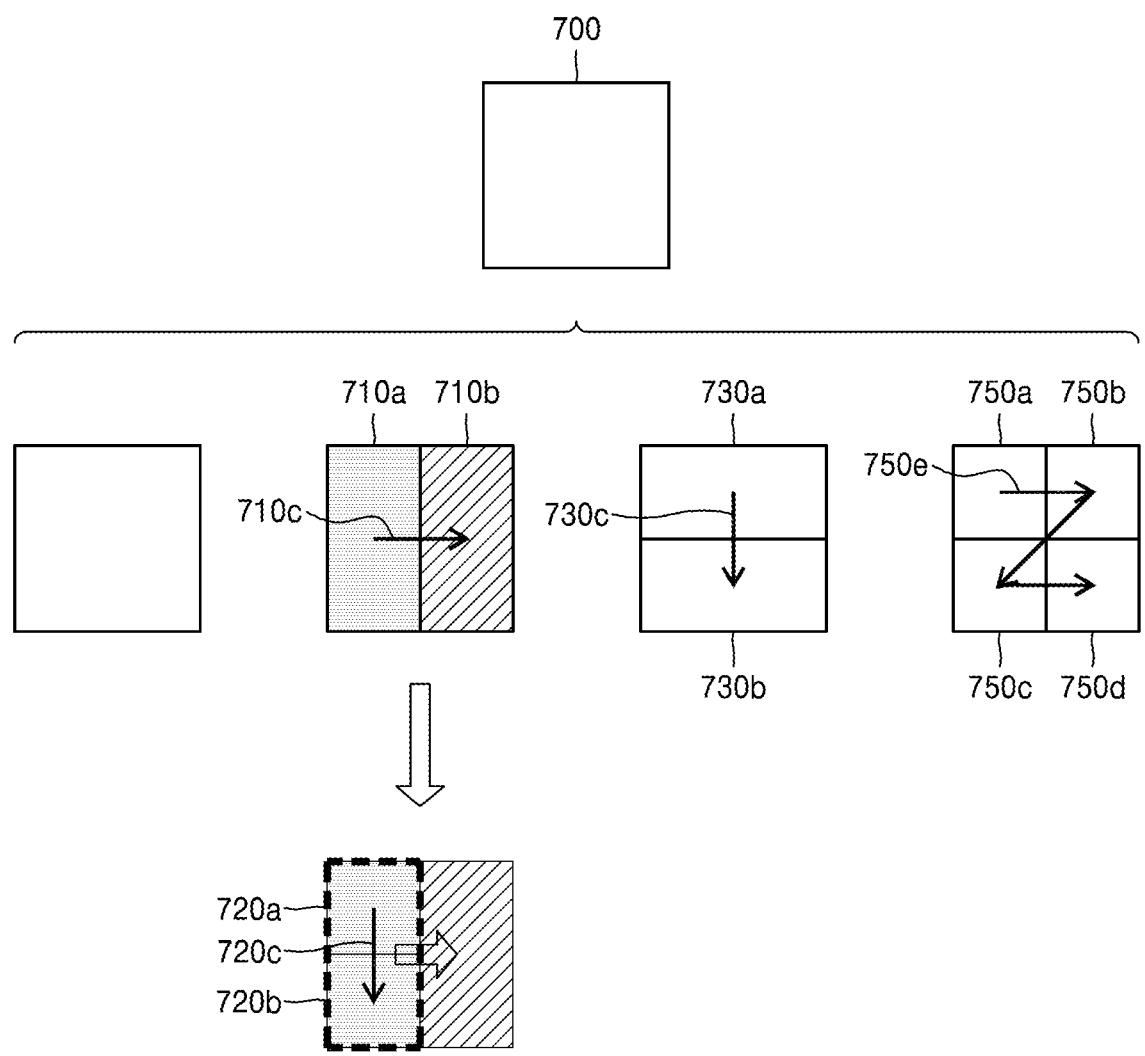
FIG. 7 illustrates an order of processing a plurality of coding units when the plurality of coding units are determined when a current coding unit is split, according to an embodiment.

FIG. 7 illustrates an order of processing a plurality of coding units when the image decoding apparatus 150 determines the plurality of coding units by splitting a current coding unit, according to an embodiment.

According to the embodiment, the image decoding apparatus 150 may determine, according to block shape information and split shape information, second coding units 710a and 710b by splitting a first coding unit 700 in a vertical direction, second coding units 730a and 730b by splitting the first coding unit 700 in a horizontal direction, or second coding units 750a, 750b, 750c, and 750d by splitting the first coding unit 700 in vertical and horizontal directions.

Referring to FIG. 7, the image decoding apparatus 150 may determine an order such that the second coding units 710a and 710b determined by splitting the first coding unit 700 in the vertical direction to be processed in a horizontal direction 710c. The image decoding apparatus 150 may determine a processing order of the second coding units 730a and 730b determined by splitting the first coding unit 600 in the horizontal direction to be in a vertical direction 730c. The image decoding apparatus 150 may determine the second coding units 750a, 750b, 750c, and 750d determined by splitting the first coding unit 700 in the vertical and horizontal directions to be processed according to a predetermined order (for example, a raster scan order or a z-scan order 650e) in which coding units in one row are processed and then coding units in a next row are processed.

According to the embodiment, the image decoding apparatus 150 may recursively split coding units. Referring to FIG. 7, the image decoding apparatus 150 may determine a plurality of coding units 710a, 710b, 730a, 730b, 750a, 750b, 750c, and 750d by splitting the first coding unit 700, and may recursively split each of the determined plurality of coding units 710a, 710b, 730a, 730b, 750a, 750b, 750c, and 750d. A method of splitting the plurality of coding units 710a, 710b, 730a, 730b, 750a, 750b, 750c, and 750d may be similar to a method of splitting the first coding unit 700. Accordingly, the plurality of coding units 710a, 710b, 730a, 730b, 750a, 750b, 750c, and 750d may each be independently split into a plurality of coding units. Referring to FIG. 7, the image decoding apparatus 150 may determine the second coding units 710a and 710b by splitting the first coding unit 700 in the vertical direction, and in addition, may determine to split or not to split each of the second coding units 710a and 710b independently.

According to the present embodiment, the image decoding apparatus 150 may split the left second coding unit 710a in the horizontal direction to obtain third coding units 720a and 720b, and may not split the right second coding unit 710b.

According to the present embodiment, a processing order of coding units may be determined based on a split process of coding units. In other words, a processing order of split coding units may be determined based on a processing order of coding units just before being split. The image decoding apparatus 150 may determine an order of processing the third coding units 720a and 720b determined when the left second coding unit 710a is split independently from the right second coding unit 710b. Since the third coding units 720a and 720b are determined when the left second coding unit 710*a* is split in the horizontal direction, the third coding units 720*a* and 720*b* may be processed in a vertical direction 720*c*. Also, since the order of processing the left second coding unit 710*a* and the right second coding unit 710*b* is in the horizontal direction 710*c*, the third coding units 720*a* and 720*b* included in the left second coding unit 710*a* may be processed in the vertical direction 720*c* and then the right second coding unit 710*b* may be processed. Because the above descriptions are for describing a process of determining a processing order according to coding units before being split, the process should not be limitedly interpreted to the above embodiments, and various methods of independently processing coding units split and determined in various shapes according to a predetermined order may be used.

Figure 8:
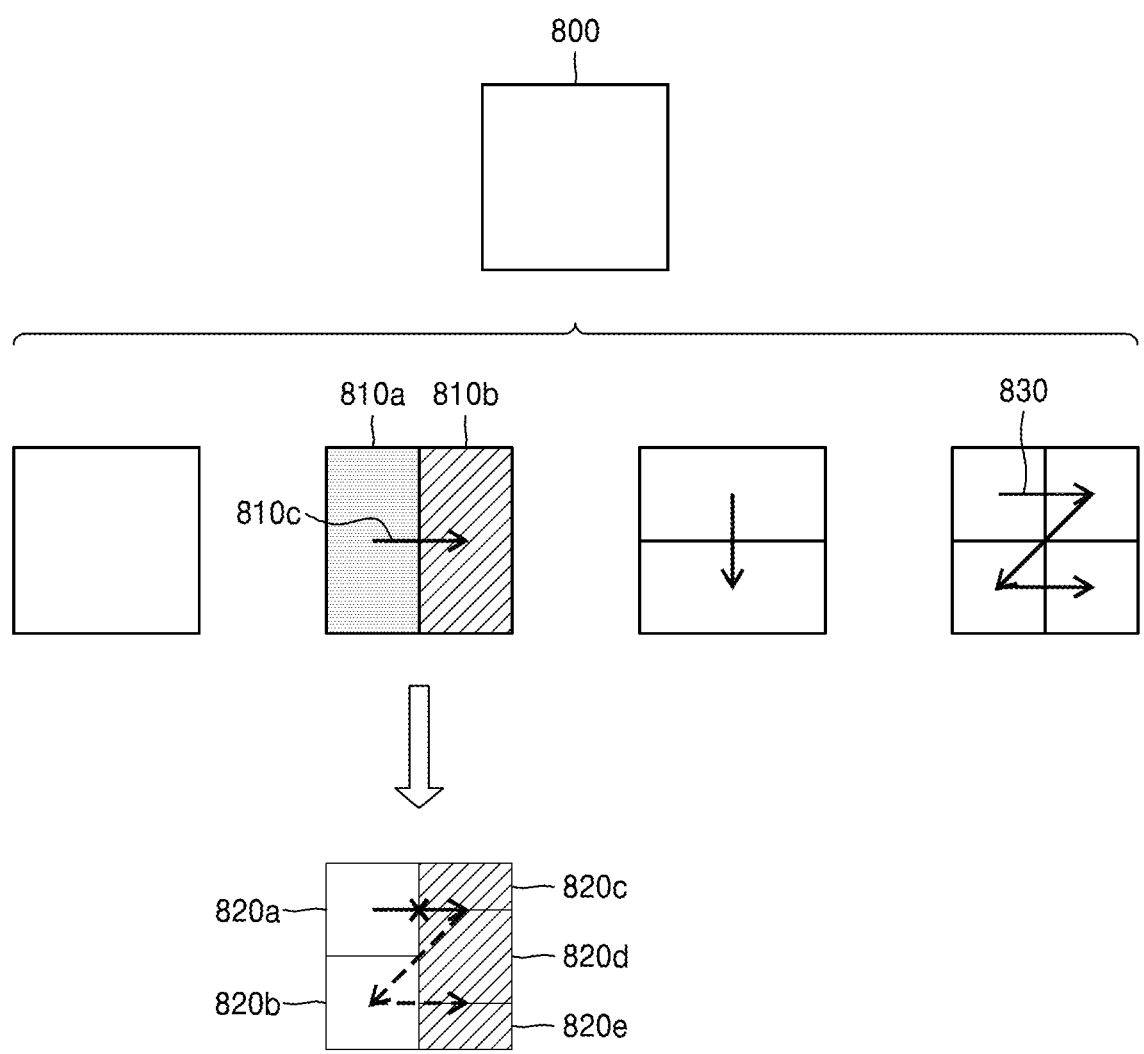
FIG. 8 illustrates a process of determining that a current coding unit is split into an odd number of coding units when coding units are unable to be processed in a predetermined order, according to an embodiment.

FIG. 8 illustrates a process of determining, by the image decoding apparatus 150, that a current coding unit is split into an odd number of coding units when coding units are unable to be processed in a predetermined order, according to an embodiment.

According to the present embodiment, the image decoding apparatus 150 may determine that the current coding unit is split into the odd number of coding units based on obtained block shape information and split shape information. Referring to FIG. 8, a first coding unit 800 having a square shape may be split into second coding units 810*a* and 810*b* having non-square shapes, and the second coding units 810*a* and 810*b* may be independently split into third coding units 820*a*, 820*b*, 820*c*, 820*d*, and 820*e*. According to the present embodiment, the image decoding apparatus 150 may determine a plurality of the third coding units 820*a* and 820*b* by splitting the left coding unit 810*a* from among the second coding units in a horizontal direction, and the right coding unit 810*b* may be split into an odd number of the third coding units 820*c*, 820*d*, and 820*e*.

According to the present embodiment, the image decoding apparatus 150 may determine whether a coding unit split into an odd number exists by determining whether the third coding units 820*a*, 820*b*, 820*c*, 820*d*, and 820*e* are processable in a predetermined order. Referring to FIG. 8, the image decoding apparatus 150 may determine the third coding units 820*a*, 820*b*, 820*c*, 820*d*, and 820*e* by recursively splitting the first coding unit 800. The image decoding apparatus 150 may determine, based on at least one of block shape information and split shape information, whether there is a coding unit split into an odd number from among the first coding unit 800, the second coding units 810*a* and 810*b*, and the third coding units 820*a*, 820*b*, 820*c*, 820*d*, and 820*e*. For example, a coding unit located at the right from among the second coding units 810*a* and 810*b* may be split into the odd number of third coding units 820*c*, 820*d*, and 820*e*. An order of processing a plurality of coding units included in the first coding unit 800 may be a predetermined order 830 (for example, a z-scan order), and the image decoding apparatus 150 may determine whether the third coding units 820*c*, 820*d*, and 820*e* determined when the right second coding unit 810*b* is split into an odd number satisfy a condition of being processable according to the predetermined order.

According to the present embodiment, the image decoding apparatus 150 may determine whether the third coding units 820*a*, 820*b*, 820*c*, 820*d*, and 820*e* included in the first coding unit 800 satisfy a condition of being processable according to a predetermined order, wherein the condition is related to whether at least one of a width and a height of the second coding units 810*a* and 810*b* is split into halves along boundaries of the third coding units 820*a*, 820*b*, 820*c*, 820*d*, and 820*e*. For example, the third coding units 820*a* and 820*b* that are determined when the left second coding unit 810*a* having a non-square shape is split into halves satisfy the condition, but the third coding units 820*c*, 820*d*, and 820*e* do not satisfy the condition since the boundaries of the third coding units 820*c*, 820*d*, and 820*e* that are determined when the right second coding unit 810*b* is split into three coding units are unable to split a width or height of the right second coding unit 810*b* into halves. Also, the image decoding apparatus 150 may determine disconnection of a scan order when the condition is dissatisfied, and determine that the right second coding unit 810*b* is split into an odd number of coding units based on the determination result. According to the present embodiment, when a coding unit is split into an odd number of coding units, the image decoding apparatus 150 may set a predetermined limitation on a coding unit at a predetermined location from among the coding units, and because details about the limitation or the predetermined location have been described above through various embodiments, details thereof are not provided again.

Figure 9:
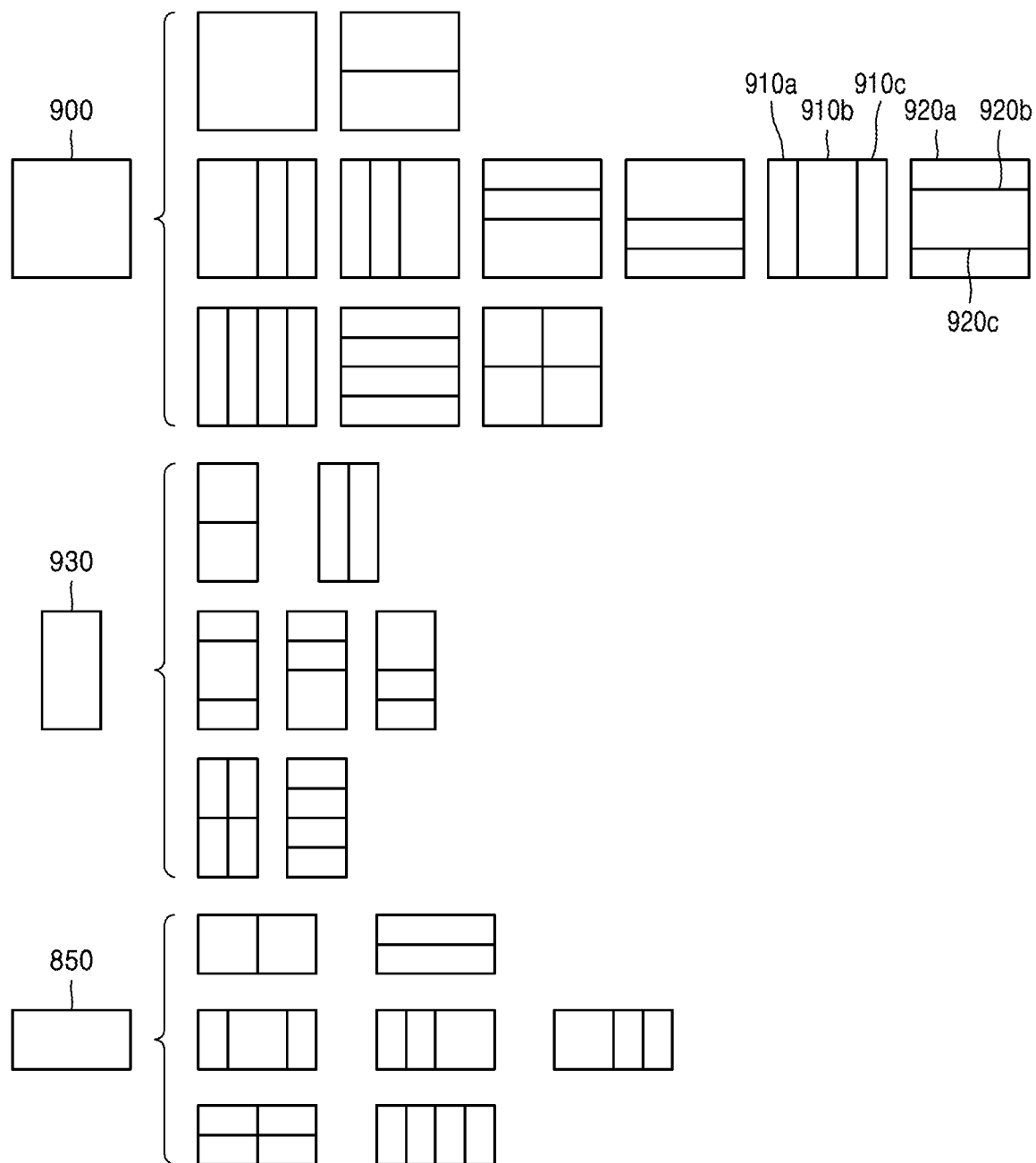
FIG. 9 illustrates a process of determining at least one coding unit when a first coding unit is split, according to an embodiment.

FIG. 9 illustrates a process of determining, by the image decoding apparatus 150, at least one coding unit when a first coding unit 900 is split, according to an embodiment. According to the present embodiment, the image decoding apparatus 150 may split the first coding unit 900 based on at least one of block shape information and split shape information obtained through the receiver 160. The first coding unit 900 having a square shape may be split into four coding units having square shapes or non-square shapes. For example, referring to FIG. 9, when block shape information indicates that the first coding unit 900 is a square and split shape information indicates that the first coding unit 900 is split into non-square coding units, the image decoding apparatus 150 may split the first coding unit 900 into a plurality of non-square coding units. In detail, when the split shape information indicates that the first coding unit 900 is split into a horizontal or vertical direction to determine an odd number of coding units, the image decoding apparatus 150 may split the first coding unit 900 having a square shape into, as the odd number of coding units, second coding units 910*a*, 910*b*, and 910*c* determined when the first coding unit 900 is split in the vertical direction, or second coding units 920*a*, 920*b*, and 920*c* determined when the first coding unit 900 is split in the horizontal direction.

According to the present embodiment, the image decoding apparatus 150 may determine whether the second coding units 910*a*, 910*b*, and 910*c* and 920*a*, 920*b*, and 920*c* included in the first coding unit 900 satisfy a condition of being processable according to a predetermined order, wherein the condition is related to whether at least one of the width and the height of the first coding unit 900 is split into halves along the boundaries of the second coding units 910*a*, 910*b*, and 910*c* and 920*a*, 920*b*, and 920*c*. Referring to FIG. 9, since the boundaries of the second coding units 910*a*, 910*b*, and 910*c* determined when the first coding unit 900 having a square shape is split in the vertical direction are unable to split the width of the first coding unit 900 into halves, it may be determined that the first coding unit 900 does not satisfy the condition of being processable according to the predetermined order. Also, since the boundaries of the second coding units 920*a*, 920*b*, and 920*c* determined when the first coding unit 900 having a square shape is split in the horizontal direction are unable to split the width of the first coding unit 900 into halves, it may be determined that the first coding unit 900 does not satisfy the condition of being processable according to the predetermined order. When the condition is dissatisfied, the image decoding apparatus 150 determines disconnection of a scan order and may determine that the first coding unit 900 is split into an odd number of coding units based on the determination result. According to the present embodiment, when a coding unit is split into an odd number of coding units, the image decoding apparatus 150 may set a predetermined limitation on a coding unit at a predetermined location from among the coding units, and since details about the limitation or the predetermined location have been described above through various embodiments, details thereof are not provided again.

According to the embodiment, the image decoding apparatus 150 may determine coding units having various shapes by splitting a first coding unit.

Referring to FIG. 9, the image decoding apparatus 150 may split the first coding unit 900 having a square shape and a first coding unit 930 or 950 having a non-square shape into coding units having various shapes.

Figure 10:
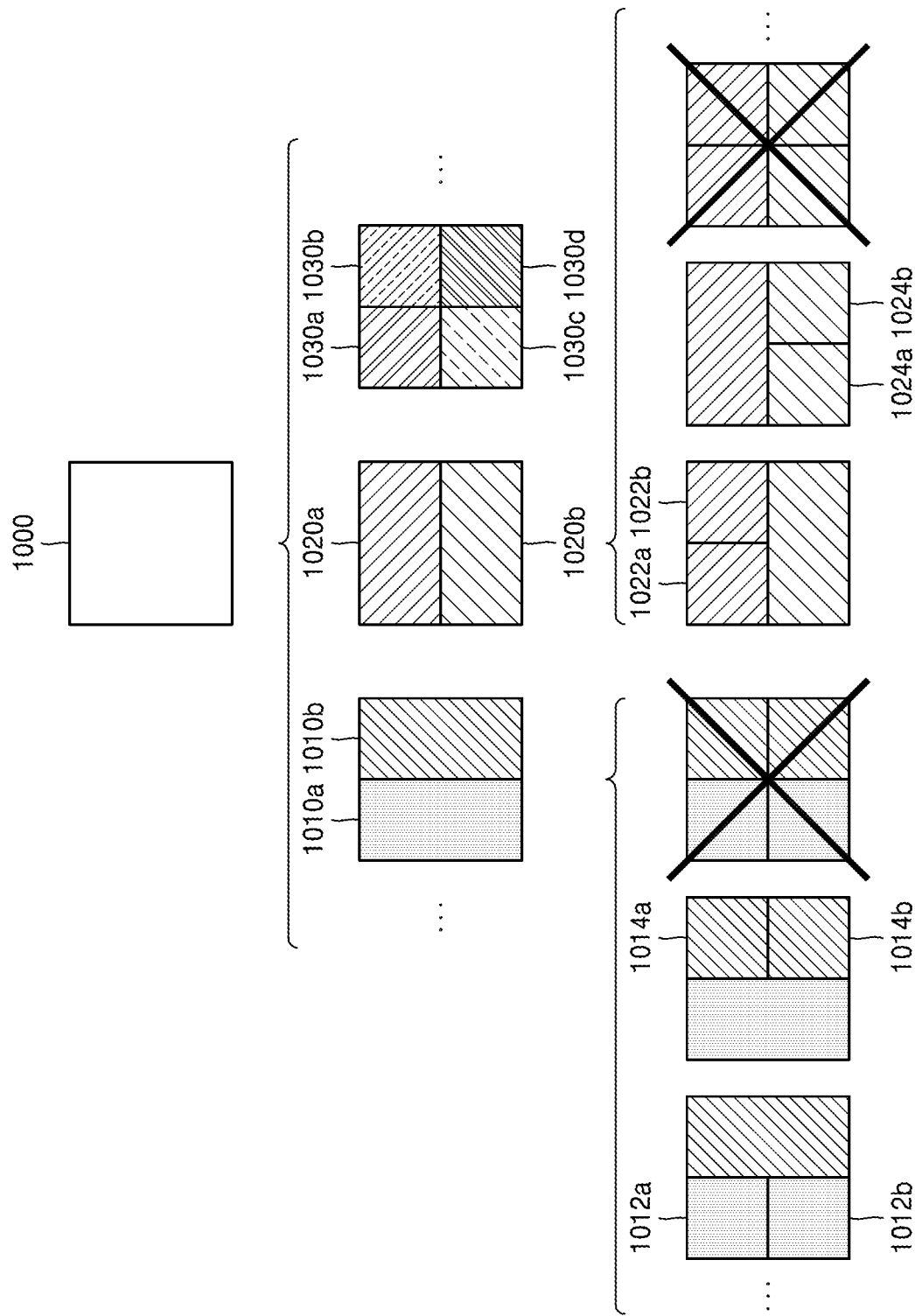
FIG. 10 illustrates that, when a second coding unit having a non-square shape, which is determined when a first coding unit is split, satisfies a predetermined condition, a shape of the second coding unit that is splittable is limited, according to an embodiment.

FIG. 10 illustrates that, when a second coding unit having a non-square shape, which is determined when a first coding unit 1000 is split, satisfies a predetermined condition, a shape of the second coding unit that is splittable is limited by the image decoding apparatus 150, according to an embodiment.

According to the present embodiment, the image decoding apparatus 150 may determine, based on at least one of block shape information and split shape information obtained through the receiver 160, to split the first coding unit 1000 having a square shape into second coding units 1010a, 1010b, 1020a, and 1020b having non-square shapes. The second coding units 1010a, 1010b, 1020a, and 1020b may be independently split. Accordingly, the image decoding apparatus 150 may determine to split or not to split the second coding units 1010a, 1010b, 1020a, and 1020b based on at least one of block shape information and split shape information related to each of the second coding units 1010a, 1010b, 1020a, and 1020b. According to the present embodiment, the image decoding apparatus 150 may determine third coding units 1012a and 1012b by splitting the left second coding unit 1010a having a non-square shape and determined when the first coding unit 1000 is split in a vertical direction. However, when the left second coding unit 1010a is split in a horizontal direction, the image decoding apparatus 150 may limit the right second coding unit 1010b not to be split in the horizontal direction like a direction in which the left second coding unit 1010a is split. When the right second coding unit 1010b is split in the same direction and third coding units 1014a and 1014b are determined, the third coding units 1012a, 1012b, 1014a, and 1014b may be determined when the left second coding unit 1010a and the right second coding unit 1010b are independently split in the horizontal direction. However, this is the same result as the image decoding apparatus 150 splitting the first coding unit 1000 into four second coding units 1030a, 1030b, 1030c, and 1030d having square shapes based on at least one of block shape information and split shape information, and thus may be inefficient in terms of image decoding.

According to the present embodiment, the image decoding apparatus 150 may determine third coding units 1022a, 1022b, 1024a, and 1024b by splitting the second coding units 1020a or 1020b having a non-square shape and determined when the first coding unit 1000 is split in the horizontal direction. However, when one of second coding units (for example, the top second coding unit 1020a) is split in the vertical direction, the image decoding apparatus 150 may limit the other second coding unit (for example, the bottom second coding unit 1020b) not to be split in the vertical direction like a direction in which the top second coding unit 1020a is split based on the above reasons.

Figure 11:
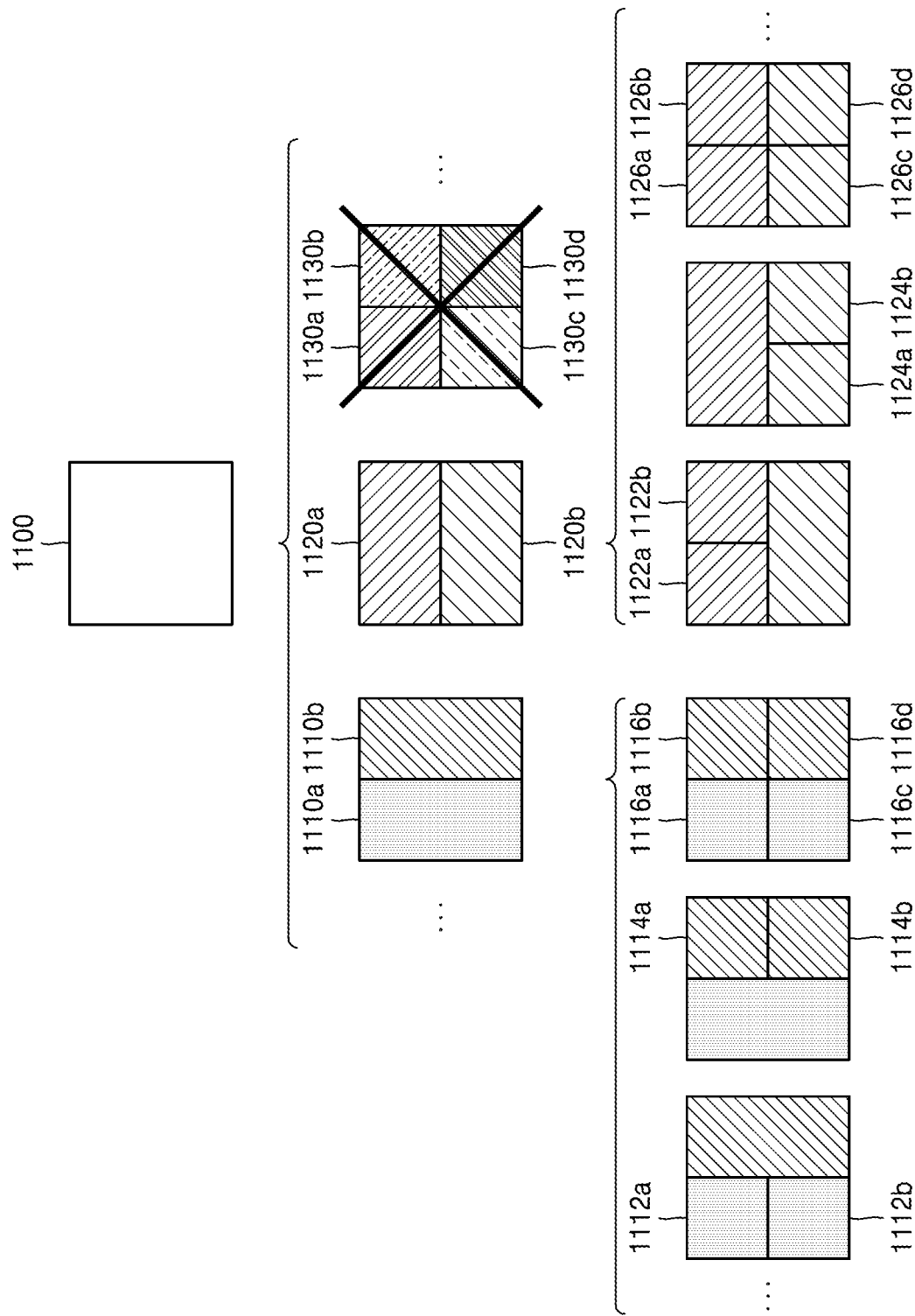
FIG. 11 illustrates a process of splitting a coding unit having a square shape when split shape information does not indicate splitting of the coding unit into four coding units having square shapes, according to an embodiment.

FIG. 11 illustrates a process of splitting, by the image decoding apparatus 150, a coding unit having a square shape when split shape information does not indicate splitting of the coding unit into four coding units having square shapes, according to an embodiment.

According to the present embodiment, the image decoding apparatus 150 may determine second coding units 1110a, 1110b, 1120a, 1020b, and the like by splitting a first coding unit 1100 based on at least one of block shape information and split shape information. The split shape information may include information about various shapes into which a coding unit is splittable, but sometimes, the information about various shapes may not include information for splitting a coding unit into four square coding units. According to such split shape information, the image decoding apparatus 150 is unable to split the first coding unit 1100 having a square shape into four square second coding units 1130a, 1130b, 1130c, and 1130d. Based on the split shape information, the image decoding apparatus 150 may determine the second coding units 1110a, 1110b, 1120a, 1120b, and the like having non-square shapes.

According to the present embodiment, the image decoding apparatus 150 may independently split the second coding units 1110a, 1110b, 1120a, 1120b, and the like having non-square shapes. Each of the second coding units 1110a, 1110b, 1120a, 1120b, and the like may be split in a predetermined order through a recursive method that may correspond to a method of splitting the first coding unit 1100 based on at least one of block shape information and split shape information.

For example, the image decoding apparatus 150 may determine third coding units 1112a and 1112b having square shapes by splitting the left second coding unit 1110a in a horizontal direction and may determine third coding units 1114a and 1114b having square shapes by splitting the right second coding unit 1110b in a horizontal direction. In addition, the image decoding apparatus 150 may determine third coding units 1116a, 1116b, 1116c, and 1116d having square shapes by splitting both the left second coding unit 1110a and the right second coding unit 1110b in the horizontal direction. In this case, coding units may be determined in the same manner in which the first coding unit 1100 is split into the four square second coding units 1130a, 1130b, 1130c, and 1130d.

As another example, the image decoding apparatus 150 may determine third coding units 1122a and 1122b having square shapes by splitting the top second coding unit 1120a in the vertical direction and determine third coding units 1124a and 1124b having square shapes by splitting the bottom second coding unit 1120b in the vertical direction. In addition, the image decoding apparatus 150 may determine third coding units 1122a, 1122b, 1124a, and 1124b having square shapes by splitting both the top second coding unit 1120a and the bottom second coding unit 1120b in the vertical direction. In this case, coding units may be determined in the same manner in which the first coding unit 1100 is split into the four square second coding units 1130a, 1130b, 1130c, and 1130d.

Figure 12:
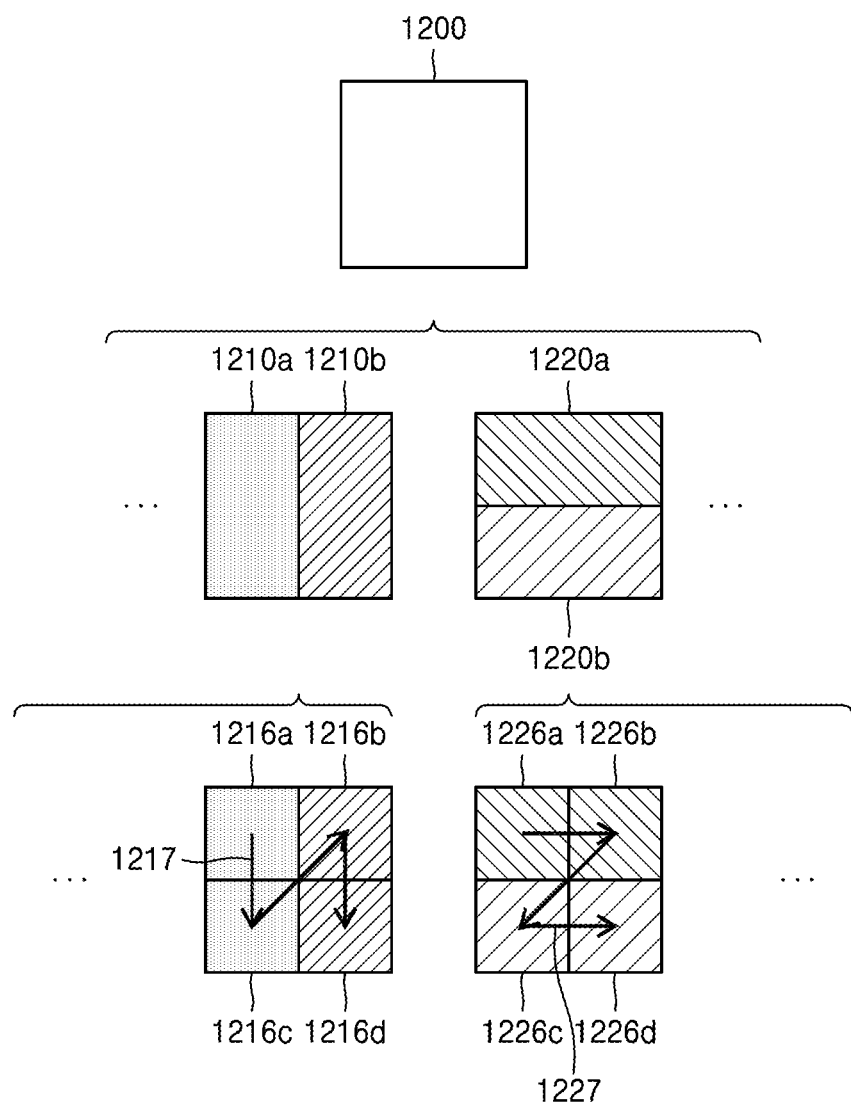
FIG. 12 illustrates that a processing order between a plurality of coding units may be changed according to a split process of a coding unit, according to an embodiment.

FIG. 12 illustrates that a processing order between a plurality of coding units may be changed according to a split process of a coding unit, according to an embodiment.

According to the present embodiment, the image decoding apparatus 150 may split a first coding unit 1200, based on block shape information and split shape information. When the block shape information indicates a square shape and the split shape information indicates that the first coding unit 1200 is split in at least one of a horizontal direction and a vertical direction, the image decoding apparatus 150 may split the first coding unit 1200 to determine second coding units (for example, second coding units 1210a, 1210b, 1220a, 1220b, 1230a, 1230b, 1230c, 1230d, and the like). Referring to FIG. 12, the second coding units 1210a, 1210b, 1220a, and 1220b having non-square shapes and determined when the first coding unit 1200 is split only in the horizontal or vertical direction may each be independently split based on block shape information and split shape information about each of the second coding units 1210a, 1210b, 1220a, and 1220b. For example, the image decoding apparatus 150 may determine third coding units 1216a, 1216b, 1216c, and 1216d by splitting the second coding units 1210a and 1210b in the horizontal direction, wherein the second coding units 1210a and 1210b are generated when the first coding unit 1200 is split in the vertical direction, and may determine third coding units 1226a, 1226b, 1226c, and 1226d by splitting the second coding units 1220a and 1220b in the horizontal direction, wherein the second coding units 1220a and 1220b are generated when the first coding unit 1200 is split in the horizontal direction. Because split processes of the second coding units 1210a, 1210b, 1220a, and 1220b have been described with reference to FIG. 9, details thereof are not provided again.

According to the present embodiment, the image decoding apparatus 150 may process coding units according to a predetermined order. Since characteristics about processing of coding units according to a predetermined order have been described above with reference to FIG. 6, details thereof are not provided again. Referring to FIG. 12, the image decoding apparatus 150 may determine four square third coding units 1216a, 1216b, 1216c, and 1216d or 1226a, 1226b, 1226c, and 1226d by splitting the first coding unit 1200 having a square shape. According to the present embodiment, the image decoding apparatus 150 may determine a processing order of the third coding units 1216a, 1216b, 1216c, and 1216d or 1226a, 1226b, 1226c, and 1226d according to a shape of the first coding unit 1200 being split.

According to the present embodiment, the image decoding apparatus 150 may determine the third coding units 1216a, 1216b, 1216c, and 1216d by splitting each of the second coding units 1210a and 1210b in the horizontal direction, wherein the second coding units 1210a and 1210b are generated when the first coding unit 1200 is split in the vertical direction, and the image decoding apparatus 150 may process the third coding units 1216a, 1216b, 1216c, and 1216d according to an order 1217 of first processing the third coding units 1216a and 1216b included in the left second coding unit 1210a in the vertical direction and then processing the third coding units 1216c and 1216d included in the right second coding unit 1210b in the vertical direction.

According to the present embodiment, the image decoding apparatus 150 may determine the second coding units 1226a, 1226b, 1226c, and 1226d by splitting each of the second coding units 1220a and 1220b in the vertical direction, wherein the second coding units 1220a and 1220b are generated when the first coding unit 1200 is split in the horizontal direction, and the image decoding apparatus 150 may process the third coding units 1226a, 1226b, 1226c, and 1226d according to an order of first processing the third coding units 1226a and 1226b included in the top second coding unit 1220a in the horizontal direction and then processing the third coding units 1226c and 1226d included in the bottom second coding unit 1220b in the horizontal direction.

Referring to FIG. 12, the third coding units 1216a, 1216b, 1216c, 1216d, 1226a, 1226b, 1226c, and 1226d having square shapes may be determined when each of the second coding units 1210a, 1210b, 1220a, and 1220b are split. The second coding units 1210a and 1210b determined when the first coding unit 1200 is split in the vertical direction and the second coding units 1220a and 1220b determined when the first coding unit 1200 is split in the horizontal direction have different shapes, but according to the third coding units 1216a, 1216b, 1216c, 1216d, 1226a, 1226b, 1226c, and 1226d determined thereafter, the first coding unit 1200 is split into coding units having the same shapes. Accordingly, even when coding units having the same shapes are determined as a result by recursively splitting coding units through different processes based on at least one of block shape information and split shape information, the image decoding apparatus 150 may process the coding units having the same shapes in different orders.

FIG. 13 illustrates a process of determining a depth of a coding unit when a shape and size of the coding unit changes, in a case where a plurality of coding units are determined when the coding unit is recursively split, according to an embodiment.

According to the present embodiment, the image decoding apparatus 150 may determine a depth of a coding unit according to a predetermined criterion. For example, the predetermined criterion may be a length of a longer side of the coding unit. When a length of a longer side of a coding unit before being split is 2n times a length of a longer side of a current coding unit, wherein n>0, the image decoding apparatus 150 may determine that a depth of the current coding unit is higher than a depth of the coding unit before being split by n. Hereinafter, a coding unit having a higher depth will be referred to as a coding unit of a lower depth.

Referring to FIG. 13, according to the present embodiment, the image decoding apparatus 150 may determine a second coding unit 1302 and a third coding unit 1304 of lower depths by splitting a first coding unit 1300 having a square shape, based on block shape information indicating a square shape (for example, block shape information may indicate '0: SQUARE'). When a size of the first coding unit 1300 having a square shape is 2N×2N, the second coding unit 1302 determined by splitting a width and a height of the first coding unit 1300 by ½ may have a size of N×N. In addition, the third coding unit 1304 determined by splitting a width and a height of the second coding unit 1302 by ½ may have a size of N/2×N/2. In this case, a width and a height of the third coding unit 1304 correspond to ½ times those of the first coding unit 1300. When a depth of the first coding unit 1300 is D, a depth of the second coding unit 1302, which is ½ times the width and height of the first coding unit 1300, may be D+1, and a depth of the third coding unit 1304, which is ½ times the width and height of the first coding unit 1300, may be D+2.

According to the present embodiment, the image decoding apparatus 150 may determine a second coding unit 1312 or 1322 and a third coding unit 1314 or 1324 of lower depths by splitting a first coding unit 1310 or 1320 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding apparatus 150 may determine second coding units (for example, the second coding units 1302, 1312, 1322, and the like) by splitting at least one of the width and the height of the first coding unit 1310 having a size of N×2N. In other words, the image decoding apparatus 150 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to the present embodiment, the image decoding apparatus 150 may determine the second coding units (for example, the second coding units 1302, 1312, 1322, and the like) by splitting at least one of the width and the height of the first coding unit 1320 having a size of 2N×N. That is, the image decoding apparatus 150 may determine the second coding unit 1302 having a size of N×N or the second coding unit 1312 having a size of N/2×N by splitting the first coding unit 1320 in the vertical direction, or may determine the second coding unit 1322 having a size of N×N/2 by splitting the first coding unit 1320 in the horizontal and vertical directions.

According to the present embodiment, the image decoding apparatus 150 may determine third coding units (for example, the third coding units 1304, 1314, 1324, and the like) by splitting at least one of a width and a height of the second coding unit 1302 having a size of N×N. That is, the image decoding apparatus 150 may determine the third coding unit 1304 having a size of N/2×N/2, the third coding unit 1314 having a size of N/2×N/2, or the third coding unit 1324 having a size of N/2×N/2 by splitting the second coding unit 1302 in vertical and horizontal directions.

According to the present embodiment, the image decoding apparatus 150 may determine the third coding units (for example, the third coding units 1304, 1314, 1324, and the like) by splitting at least one of a width and a height of the second coding unit 1312 having a size of N/2×N. That is, the image decoding apparatus 150 may determine the third coding unit 1304 having a size of N/2×N/2 or the third coding unit 1324 having a size of N/2×N/2 by splitting the second coding unit 1312 in a horizontal direction, or determine the third coding unit 1314 having a size of N/2×N/2 by splitting the second coding unit 1312 in vertical and horizontal directions.

According to the present embodiment, the image decoding apparatus 150 may determine the third coding units (for example, the third coding units 1304, 1314, 1324, and the like) by splitting at least one of a width and a height of the second coding unit 1314 having a size of N×N/2. That is, the image decoding apparatus 150 may determine the third coding unit 1304 having a size of N/2×N/2 or the third coding unit 1314 having a size of N/2×N/2 by splitting the second coding unit 1312 in a vertical direction, or determine the third coding unit 1324 having a size of N/2×N/2 by splitting the second coding unit 1312 in vertical and horizontal directions.

According to the present embodiment, the image decoding apparatus 150 may split coding units having square shapes (for example, the first coding units 1300, 1302, and 1304) in a horizontal or vertical direction. For example, the first coding unit 1300 having a size of 2N×2N may be split in the vertical direction to determine the first coding unit 1310 having a size of N×2N or in the horizontal direction to determine the first coding unit 1320 having a size of 2N×N/. According to the present embodiment, when a depth is determined based on a length of a longest side of a coding unit, a depth of a coding unit determined when the first coding unit 1300, 1302, or 1304 is split in the horizontal or vertical direction may be the same as a depth of the first coding unit 1300, 1302, or 1304.

According to the present embodiment, the width and height of the third coding unit 1314 or 1324 may be ½ times the first coding unit 1310 or 1320. When the depth of the first coding unit 1310 or 1320 is D, the depth of the second coding unit 1312 or 1314, which is ½ times the width and height of the first coding unit 1310 or 1320, may be D+1, and the depth of the third coding unit 1314 or 1324, which is ½ times the width and height of the first coding unit 1310 or 1320, may be D+2.

Figure 14:
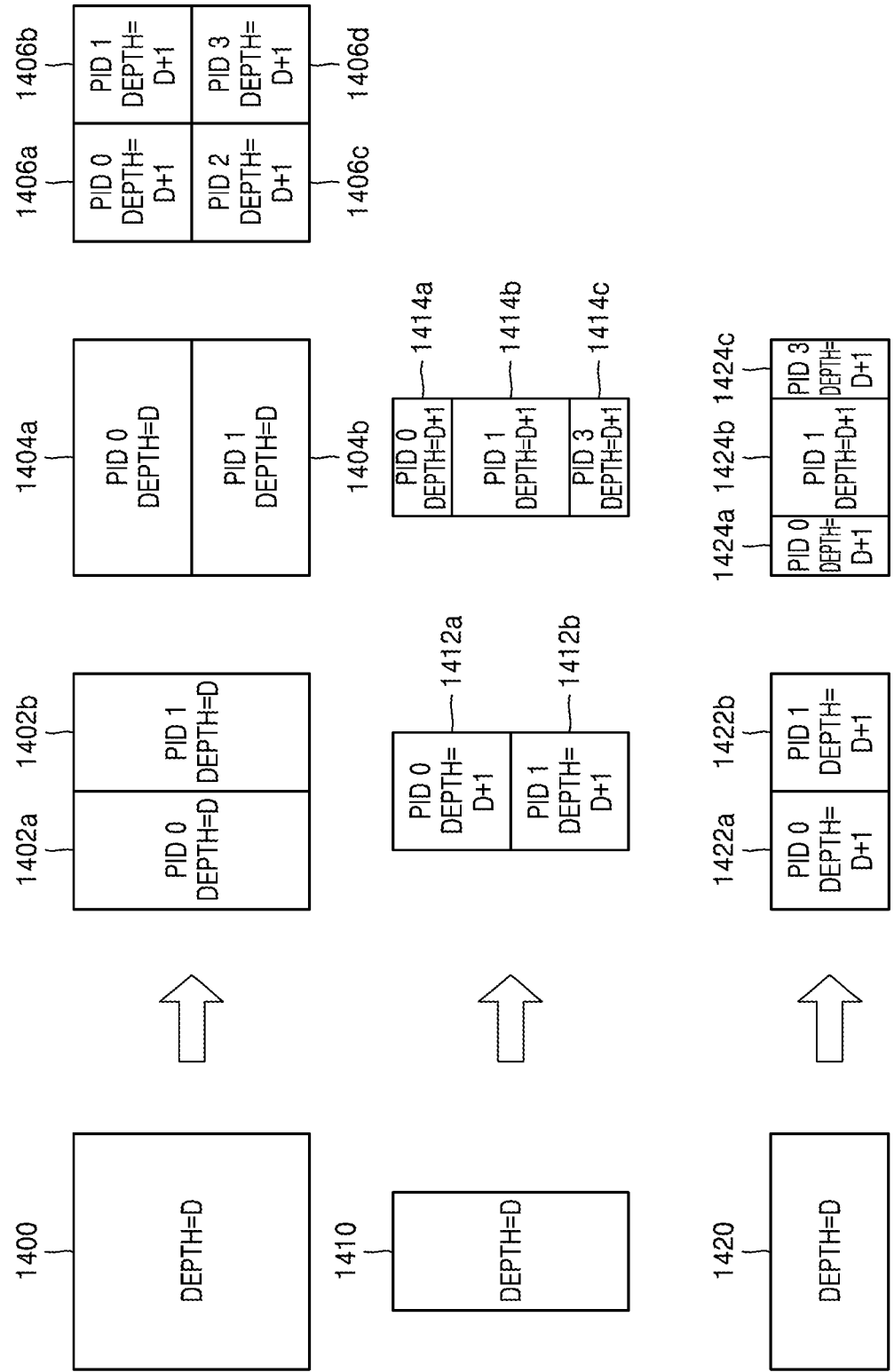
FIG. 14 illustrates a depth determinable according to shapes and sizes of coding units, and a part index (PID) for distinguishing between the coding units, according to an embodiment.

FIG. 14 illustrates a depth determinable according to shapes and sizes of coding units, and a part index (PID) for distinguishing between the coding units, according to an embodiment.

According to the present embodiment, the image decoding apparatus 150 may determine second coding units having various shapes by splitting a first coding unit 1400 having a square shape. Referring to FIG. 14, the image decoding apparatus 150 may determine second coding units 1402a, 1402b, 1404a, 1404b, 1406a, 1406b, 1406c, and 1406d by splitting the first coding unit 1400 in at least one of a vertical direction and a horizontal direction, according to split shape information. That is, the image decoding apparatus 150 may determine the second coding units 1402a, 1402b, 1404a, 1404b, 1406a, 1406b, 1406c, and 1406d based on split shape information about the first coding unit 1400.

According to the present embodiment, depths of the second coding units 1402a, 1402b, 1404a, 1404b, 1406a, 1406b, 1406c, and 1406d determined according to the split shape information about the first coding unit 1400 having a square shape may be determined based on lengths of longer sides. For example, since lengths of longer sides of the second coding units 1402a, 1402b, 1404a, and 1404b having non-square shapes are the same as a length of one side of the first coding unit 1400 having a square shape, depths of the first coding unit 1400 and the second coding units 1402a, 1402b, 1404a, and 1404b having non-square shapes may be D, i.e., the same. On the other hand, when the image decoding apparatus 150 splits the first coding unit 1400 into the four second coding units 1406a, 1406b, 1406c, and 1406d having square shapes based on split shape information, since a length of one side of each of the second coding units 1406a, 1406b, 1406c, and 1406d having square shapes is ½ of a length of one side of the first coding unit 1400, depths of the second coding units 1406a, 1406b, 1406c, and 1406d may be D+1, i.e., one depth lower than the depth D of the first coding unit 1400.

According to the present embodiment, the image decoding apparatus 150 may split a first coding unit 1410 having a height longer than a width into a plurality of second coding units 1412a, 1412b, 1414a, 1414b, and 1414c by splitting the first coding unit 1410 in a horizontal direction according to split shape information. According to the present embodiment, the image decoding apparatus 150 may split a first coding unit 1420 having a width longer than a height into a plurality of second coding units 1422a and 1422b, or 1424a, 1424b, and 1424c by splitting the first coding unit 1420 in a vertical direction according to split shape information.

According to the present embodiment, depths of the second coding units 1412a, 1412b, 1414a, 1414b, 1416a, 1416b, 1416c, and 1416d determined according to the split shape information about the first coding unit 1410 or 1420 having a non-square shape may be determined based on lengths of longer sides. For example, since a length of one side of each of the second coding units 1412a and 1412b having square shapes is ½ of a length of one side of the first coding unit 1410 having a non-square shape in which a height is longer than a width, the depths of the second coding units 1402a, 1402b, 1404a, and 1404b having square shapes are D+1, i.e., one depth lower than the depth D of the first coding unit 1410 having a non-square shape.

In addition, the image decoding apparatus 150 may split the first coding unit 1410 having a non-square shape into an odd number of the second coding units 1414a, 1414b, and 1414c based on split shape information. The odd number of second coding units 1414a, 1414b, and 1414c may include the second coding units 1414a and 1414c having non-square shapes and the second coding unit 1414b having a square shape. Here, since lengths of longer sides of the second coding units 1414a and 1414c having non-square shapes and a length of one side of the second coding unit 1414b having a square shape are ½ of a length of one side of the first coding unit 1410, depths of the second coding units 1414a, 1414b, and 1414c may be D+1, i.e., one depth lower than the depth D of the first coding unit 1410. The image decoding apparatus 150 may determine depths of coding units related to the first coding unit 1410 having a non-square shape in which a width is longer than a height in the similar manner as depths of coding units related to the first coding unit 1410 are determined.

According to the present embodiment, while determining PIDs for distinguishing between coding units, the image decoding apparatus 150 may determine the PIDs based on size ratios between the coding units when an odd number of the coding units do not have the same size. Referring to FIG. 14, the coding unit 1414b located at the center of the odd number of coding units 1414a, 1414b, and 1414c has the same width as the coding units 1414a and 1414c, but has a height twice higher than heights of the coding units 1414a and 1414c. In this case, the coding unit 1414b located at the center may include two of each of the coding units 1414a and 1414c. Accordingly, when a PID of the coding unit 1414b located at the center according to a scan order is 1, a PID of the coding unit 1414c located in a next order may be increased by 2, i.e., 3. That is, values of PIDs may be discontinuous. According to the present embodiment, the image decoding apparatus 150 may determine whether an odd number of coding units have the same size based on discontinuity of PIDs for distinguishing between the coding units.

According to the present embodiment, the image decoding apparatus 150 may determine whether a plurality of coding units determined when a current coding unit is split have certain split shapes based on values of PIDs for distinguishing between the coding units. Referring to FIG. 14, the image decoding apparatus 150 may determine an even number of the coding units 1412a and 1412b or an odd number of the coding units 1414a, 1414b, and 1414c by splitting the first coding unit 1410 having a rectangular shape in which a height is longer than a width. The image decoding apparatus 150 may use an ID indicating each coding unit so as to distinguish between a plurality of coding units. According to the present embodiment, the PID may be obtained from a sample at a predetermined location (for example, an upper left sample) of each coding unit.

According to the present embodiment, the image decoding apparatus 150 may determine a coding unit at a predetermined location from among coding units determined via split, by using PIDs for distinguishing between the coding units. According to an embodiment, when split shape information about the first coding unit 1410 having a rectangular shape in which a height is longer than a width indicates split into three coding units, the image decoding apparatus 150 may split the first coding unit 1410 into the three coding units 1414a, 1414b, and 1414c. The image decoding apparatus 150 may allocate a PID to each of the three coding units 1414a, 1414b, and 1414c. The image decoding apparatus 150 may compare PIDs of coding units so as to determine a center coding unit from among an odd number of coding units. The image decoding apparatus 150 may determine the coding unit 1414b having a PID corresponding to a center value from among PIDs as a coding unit located at the center from among coding units determined when the first coding unit 1410 is split, based on PIDs of the coding units. According to the present embodiment, the image decoding apparatus 150 may determine PIDs based on size ratios between coding units when the coding units do not have the same size, while determining the PIDs for distinguishing between the coding units. Referring to FIG. 14, the coding unit 1414b generated when the first coding unit 1410 is split may have the same width as the coding units 1414a and 1414c, but may have a height twice higher than heights of the coding units 1414a and 1414c. In this case, when the PID of the coding unit 1414b located at the center is 1, the PID of the coding unit 1414c located in a next order may be increased by 2, i.e., 3. As such, when an increase range changes while PIDs are uniformly increasing, the image decoding apparatus 150 may determine that a coding unit is split into a plurality of coding units including a coding unit having a different size from other coding units. According to the present embodiment, when split shape information indicates split into an odd number of coding units, the image decoding apparatus 150 may split a current coding unit into an odd number of coding units in which a coding unit at a predetermined location (for example, a center coding unit) has a different size from other coding units. In this case, the image decoding apparatus 150 may determine the center coding unit having the different size by using PIDs of the coding units. However, since the PID, and a size or location of a coding unit at a predetermined location are specified to describe the present embodiment, and thus the present disclosure is not limited thereto, and various PIDs, and various locations and sizes of a coding unit may be used.

According to the present embodiment, the image decoding apparatus 150 may use a predetermined data unit from which a coding unit starts to be recursively split.

Figure 15:
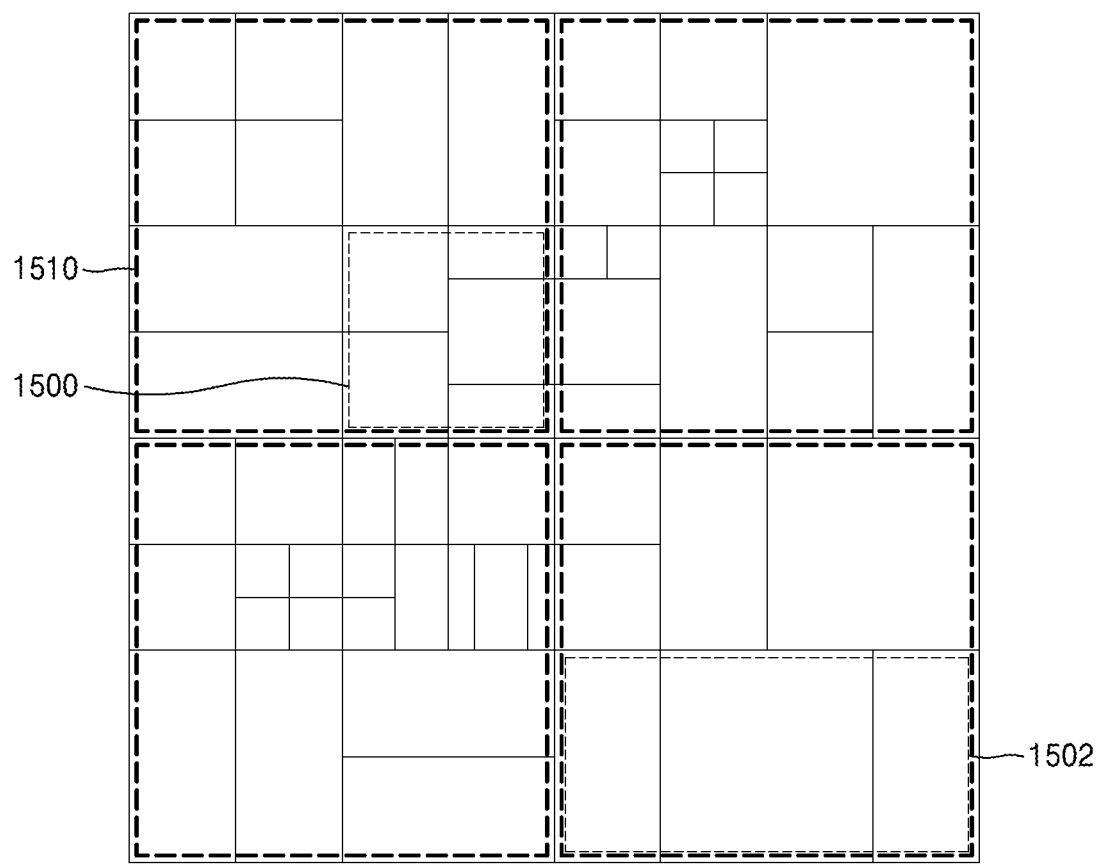
FIG. 15 illustrates that a plurality of coding units are determined according to a plurality of predetermined data units included in a picture, according to an embodiment.

FIG. 15 illustrates that a plurality of coding units are determined according to a plurality of predetermined data units included in a picture, according to an embodiment.

According to the present embodiment, a predetermined data unit may be defined as a data unit from which a coding unit starts to be recursively split by using at least one of block shape information and split shape information. That is, the predetermined data unit may correspond to a coding unit of an uppermost depth used while determining a plurality of coding units splitting a current picture. Hereinafter, for convenience of description, such a predetermined data unit is referred to as a reference data unit.

According to the present embodiment, a reference data unit may indicate a predetermined size and shape. According to an embodiment, a reference coding unit may include M×N samples. Here, M and N may be equal to each other, and may be an integer expressed as a multiple of 2. That is, a reference data unit may indicate a square shape or a non-square shape, and may later be split into an integer number of coding units.

According to the present embodiment, the image decoding apparatus 150 may split a current picture into a plurality of reference data units. According to the present embodiment, the image decoding apparatus 150 may split the plurality of reference data units obtained by splitting the current picture by using split information about each of the reference data units. Split processes of such reference data units may correspond to split processes using a quad-tree structure.

According to the present embodiment, the image decoding apparatus 150 may pre-determine a smallest size available for the reference data unit included in the current picture. Accordingly, the image decoding apparatus 150 may determine the reference data unit having various sizes that are equal to or larger than the smallest size, and determine at least one coding unit based on the determined reference data unit by using block shape information and split shape information.

Referring to FIG. 15, the image decoding apparatus 150 may use a reference coding unit 1500 having a square shape, or may use a reference coding unit 1502 having a non-square shape. According to the embodiment, a shape and size of a reference coding unit may be determined according to various data units (for example, a sequence, a picture, a slice, a slice segment, and a largest coding unit) that may include at least one reference coding unit.

According to the embodiment, the receiver 160 of the image decoding apparatus 150 may obtain, from a bitstream, at least one of information about a shape of a reference coding unit and information about a size of the reference coding unit, according to the various data units. Processes of determining at least one coding unit included in the reference coding unit 1500 having a square shape have been described above through processes of splitting the current coding unit 300 of FIG. 3, and processes of determining at least one coding unit included in the reference coding unit 1500 having a non-square shape have been described above through processes of splitting the current coding unit 1200 or 1250 of FIG. 12, and thus descriptions thereof are not provided here.

According to the embodiment, to determine a size and shape of a reference coding unit according to some data units pre-determined based on a predetermined condition, the image decoding apparatus 150 may use a PID for checking the size and shape of the reference coding unit. That is, the receiver 160 may obtain, from a bitstream, only a PID for checking a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 150 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding apparatus 150 may select at least one of the pre-determined size and shape of the reference coding unit according to the PID so as to determine at least one of the size and shape of the reference coding unit included in a data unit that is a criterion for obtaining the PID.

According to the embodiment, the image decoding apparatus 150 may use at least one reference coding unit included in one largest coding unit. That is, a largest coding unit splitting an image may include at least one reference coding unit, and a coding unit may be determined when each of the reference coding unit is recursively split. According to the present embodiment, at least one of a width and height of the largest coding unit may be an integer times at least one of a width and height of the reference coding unit. According to the present embodiment, a size of a reference coding unit may be equal to a size of a largest coding unit, which is split n times according to a quad-tree structure. That is, the image decoding apparatus 150 may determine a reference coding unit by splitting a largest coding unit n times according to a quad-tree structure, and split the reference coding unit based on at least one of block shape information and split shape information according to various embodiments.

Figure 16:
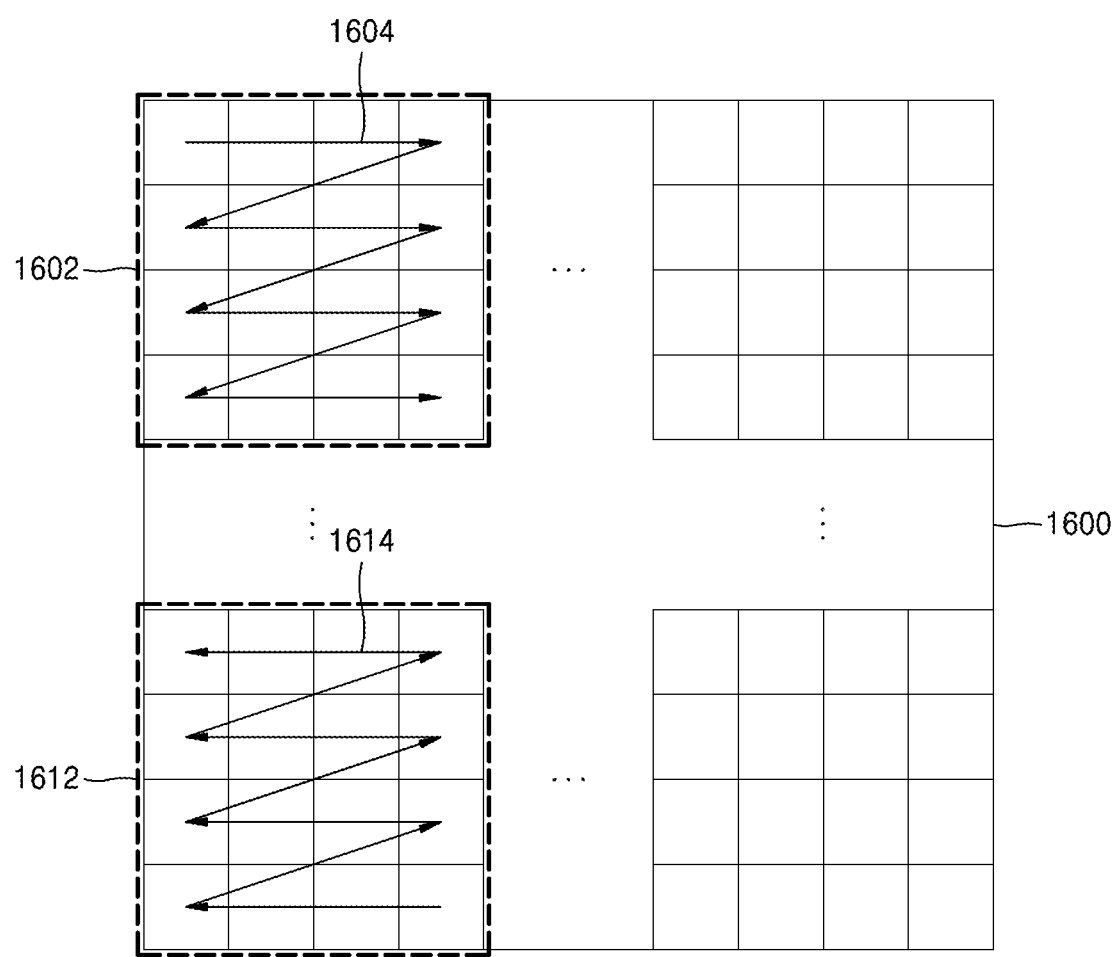
FIG. 16 illustrates a processing block that is a criterion in determining a determining order of a reference coding unit included in a picture, according to an embodiment.

FIG. 16 illustrates a processing block that is a criterion in determining a determining order of a reference coding unit included in a picture 1600, according to an embodiment.

According to the embodiment, the image decoding apparatus 150 may determine at least one processing block splitting a picture. A processing block is a data unit including at least one reference coding unit splitting an image, and the at least one reference coding unit included in the processing block may be determined in a certain order. That is, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to the present embodiment, the image decoding apparatus 150 may determine a size of at least one processing block included in an image by obtaining information about a size of a processing block. The image decoding apparatus 150 may obtain, from a bitstream, the information about a size of a processing block to determine the size of the at least one processing block included in the image. The size of the processing block may be a predetermined size of a data unit indicated by the information about a size of a processing block.

According to the embodiment, the receiver 160 of the image decoding apparatus 150 may obtain, from the bitstream, the information about a size of a processing block according to certain data units. For example, the information about a size of a processing block may be obtained from the bitstream in data units of images, sequences, pictures, slices, and slice segments. That is, the receiver 160 may obtain, from the bitstream, the information about a size of a processing block according to such several data units, and the image decoding apparatus 150 may determine the size of at least one processing block splitting the picture by using the obtained information about a size of a processing block, wherein the size of the processing block may be an integer times a size of a reference coding unit.

According to the embodiment, the image decoding apparatus 150 may determine sizes of processing blocks 1602 and 1612 included in the picture 1600. For example, the image decoding apparatus 150 may determine a size of a processing block based on information about a size of a processing block, the information obtained from a bitstream. Referring to FIG. 16, the image decoding apparatus 150 may determine horizontal sizes of the processing blocks 1602 and 1612 to be four times a horizontal size of a reference coding unit, and a vertical size thereof to be four times a vertical size of the reference coding unit, according to an embodiment. The image decoding apparatus 150 may determine a determining order of at least one reference coding unit in at least one processing block.

According to the embodiment, the image decoding apparatus 150 may determine each of the processing blocks 1602 and 1612 included in the picture 1600 based on a size of a processing block, and may determine a determining order of at least one reference coding unit included in each of the processing blocks 1602 and 1612. According to the embodiment, determining of a reference coding unit may include determining of a size of the reference coding unit.

According to the embodiment, the image decoding apparatus 150 may obtain, from a bitstream, information about a determining order of at least one reference coding unit included in at least one processing block, and may determine the determining order of the at least one reference coding unit based on the obtained information. The information about a determining order may be defined as an order or direction of determining reference coding units in a processing block. That is, an order of determining reference coding units may be independently determined per processing block.

According to the embodiment, the image decoding apparatus 150 may obtain, from a bitstream, information about a determining order of a reference coding unit according to certain data units. For example, the receiver 160 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to the embodiment, the image decoding apparatus 150 may determine at least one reference coding unit based on the determined order.

According to the embodiment, the receiver 160 may obtain, from the bitstream, information about a determining order of a reference coding unit, as information related to the processing blocks 1602 and 1612, and the image decoding apparatus 150 may determine an order of determining at least one reference coding unit included in the processing blocks 1602 and 1612 and determine at least one reference coding unit included in the picture 1600 according to a determining order of a coding unit. Referring to FIG. 16, the image decoding apparatus 150 may determine determining orders 1604 and 1614 of at least one reference coding unit respectively related to the processing blocks 1602 and 1612. For example, when information about a determining order of a reference coding unit is obtained per processing block, determining orders of a reference coding unit related to the processing blocks 1602 and 1612 may be different from each other. When the determining order 1604 related to the processing block 1602 is a raster scan order, reference coding units included in the processing block 1602 may be determined according to the raster scan order. On the other hand, when the determining order 1614 related to the processing block 1612 is an inverse order of a changed raster scan order, reference coding units included in the processing block 1612 may be determined in the inverse order of the changed raster scan order.

Figure 17:
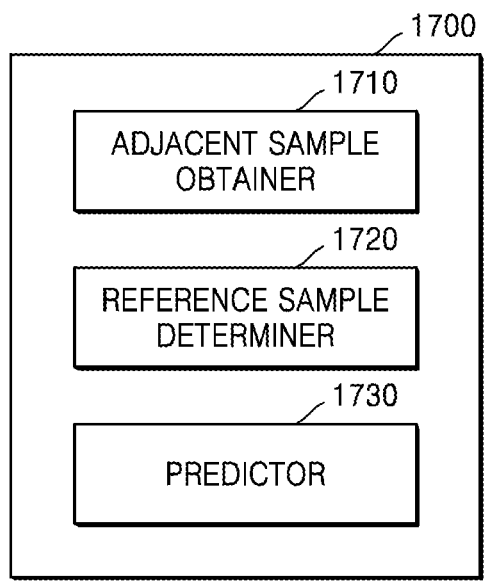
FIG. 17 illustrates an image predicting apparatus 1700 performing intra prediction on blocks included in an image.

FIG. 17 illustrates an image predicting apparatus 1700 performing intra prediction on blocks included in an image.

The image predicting apparatus 1700 includes an adjacent sample obtainer 1710, a reference sample determiner 1720, and a predictor 1730. Referring to FIG. 17, the adjacent sample obtainer 1710, the reference sample determiner 1720, and the predictor 1730 are formed as separate elements, but in another embodiment, the adjacent sample obtainer 1710, the reference sample determiner 1720, and the predictor 1730 may be integrated to be implemented as one element.

Referring to FIG. 17, the adjacent sample obtainer 1710, the reference sample determiner 1720, and the predictor 1730 are seen as elements located within one apparatus, but the adjacent sample obtainer 1710, the reference sample determiner 1720, and the predictor 1730 are not required to be physically adjacent to each other. Thus, in another embodiment, the adjacent sample obtainer 1710, the reference sample determiner 1720, and the predictor 1730 may be dispersed.

The adjacent sample obtainer 1710, the reference sample determiner 1720, and the predictor 1730 may be implemented by one processor. In another embodiment, the adjacent sample obtainer 1710, the reference sample determiner 1720, and the predictor 1730 may be implemented by a plurality of processors.

The adjacent sample obtainer 1710, the reference sample determiner 1720, and the predictor 1730 may be stored in the form of a program in a storage medium of the image predicting apparatus 1700. Also, the program that performs functions of the adjacent sample obtainer 1710, the reference sample determiner 1720, and the predictor 1730 may be externally obtained when required by the image predicting apparatus 1700.

The functions performed by the adjacent sample obtainer 1710, the reference sample determiner 1720, and the predictor 1730 of FIG. 17 may be performed by the encoder 110 of FIG. 1A and the decoder 170 of FIG. 1B.

The adjacent sample obtainer 1710 obtains a plurality of adjacent samples located adjacent to a current block. The adjacent samples are used to predict samples included in the current block. Thus, samples that were reconstructed before reconstruction of the current block are obtained as the adjacent samples.

According to the raster scan order described with reference to FIG. 16, samples that are adjacent to the top of the current block have been previously reconstructed before the current block, provided that the current block is not located at an uppermost part of a current picture. Thus, the samples that are included in an upper block of the current block and are adjacent to the current block are included in the adjacent samples of the current block.

Equally, samples that are adjacent to a left side of the current block have been previously reconstructed before the current block, provided that the current block is not located at a leftmost part of the current picture. Thus, the samples that are included in a left block of the current block and are adjacent to the current block are included in the adjacent samples of the current block.

According to the raster scan order, a right block of the current block is reconstructed after reconstruction of the current block. Thus, in a case where a direction of an intra mode of the current block is an upper right direction, the adjacent samples of the current block are obtained from an upper right block of the current block, not from the right block of the current block. In more detail, lowermost samples in the upper right block are included in the adjacent samples.

Equally, according to the raster scan order, a lower block of the current block is reconstructed after reconstruction of the current block. Thus, in a case where a direction of the intra mode of the current block is a lower left direction, the adjacent samples of the current block are obtained from a lower left block of the current block, not from the lower block of the current block. In more detail, rightmost samples in the lower left block are included in the adjacent samples.

In a case where there is a block that was not reconstructed from among adjacent blocks that the current block refers to, the adjacent sample obtainer 1710 may generate substitution adjacent samples by referring to the adjacent samples obtained from the reconstructed block, the substitution adjacent samples corresponding to locations of the adjacent samples in the not-reconstructed block. When the current block is located at an edge of the image or an adjacent block is reconstructed after the current block according to a reconstruction order, the current block cannot refer to the adjacent block. Thus, the adjacent sample obtainer 1710 marks adjacent samples in the reconstructed block with 'available', and marks adjacent samples corresponding to the not-reconstructed block with 'not available'. Then, the adjacent sample obtainer 1710 obtains, from the adjacent block, sample values of the adjacent samples marked with 'available', and substitutes substitution adjacent samples for the adjacent samples marked with 'not available', the substitution adjacent samples being determined from the adjacent samples marked with 'available', The substitution adjacent sample may be determined based on an average value of the adjacent samples marked with 'available'. Also, the substitution adjacent sample may be determined based on a sample value of an adjacent sample marked with 'available', the adjacent sample being located most adjacent to the adjacent samples marked with 'not available'. In addition, the substitution adjacent sample may be determined according to various methods.

A method of determining the substitution adjacent sample may be determined according to the current block or an attribute of an upper data unit of the current block. Also, the method of determining the substitution adjacent sample may be determined to be a most efficient method from among a plurality of determining methods, regardless of the current block or the attribute of the upper data unit of the current block. The most efficient method of determining the substitution adjacent sample with respect to the current block may be included in the form of a flag in a bitstream and may be transmitted from an encoder to a decoder.

The adjacent sample obtainer 1710 may smooth the obtained adjacent samples by using a smoothing filter. The smoothing filter to be used in a smoothing operation may be determined according to a degree of a difference between the adjacent samples. Whether to smooth the adjacent samples may be determined according to a size and an intra mode of the current block. When the adjacent samples are smoothed, values of the adjacent samples have continuity such that prediction accuracy may be increased.

The reference sample determiner 1720 may generate a one-dimensional adjacent sample array including the adjacent samples. Locations of the adjacent samples are expressed as x-coordinate values and y-coordinate values. Thus, when a reference sample is searched from among the adjacent samples, two variables with respect to locations of the adjacent samples are considered, thus, complexity in calculation may be increased.

However, when the adjacent samples are converted to have a same x-coordinate value or a same y-coordinate value, locations of the adjacent samples are expressed as an x-coordinate value or a y-coordinate value. For example, when the adjacent samples are all converted to have a same x-coordinate value, the locations of the adjacent samples may be expressed as y-coordinate values. An array of adjacent samples in a row, the adjacent samples having been converted and expressed as one variable, is referred to as a one-dimensional adjacent sample array. Because a location of an adjacent sample is expressed as one variable in the one-dimensional adjacent sample array, complexity in calculation may be decreased when the reference sample is searched from the one-dimensional adjacent sample array.

The reference sample to be referred to by the current sample may be further easily determined from the one-dimensional adjacent sample array. For example, in a case where adjacent samples obtained from an upper block and adjacent samples obtained from a left block are used together to predict the current block, coordinates of the adjacent samples are simplified to be one dimensional, such that the reference sample to be referred to by the current sample may be easily determined.

A method of determining the one-dimensional adjacent sample array will now be described with reference to FIGS. 18A to 18B.

Figure 18A:
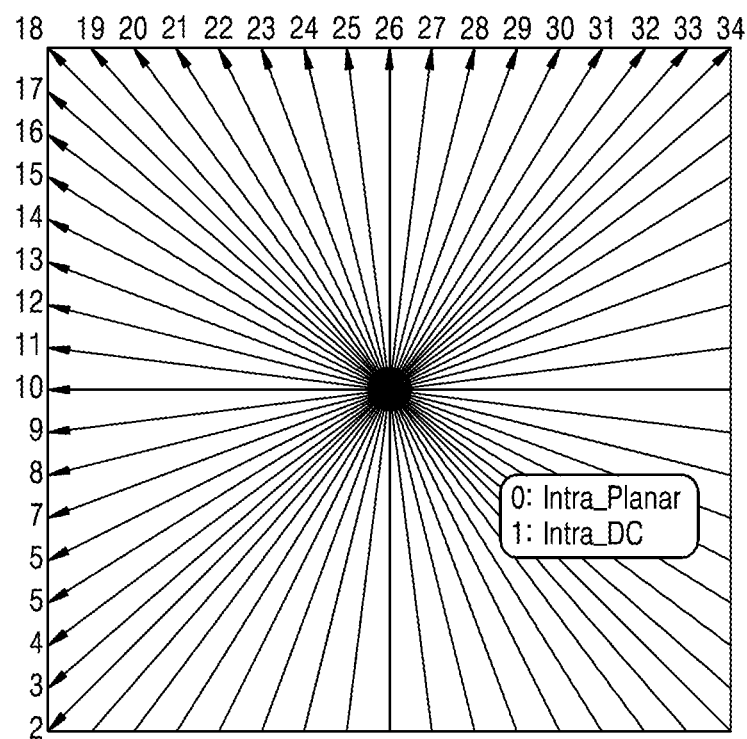
FIGS. 18A and 18B illustrate a method, performed by an adjacent sample obtainer, of determining a one-dimensional adjacent sample array.

FIG. 18A illustrates an embodiment of intra modes that may be used in intra prediction. An intra mode 0 and an intra mode 1 respectively indicate a planar mode and a DC mode. The planar mode and the DC mode are non-directional intra modes without having directionality. On the other hand, intra modes 2 to 34 indicate directional intra modes having directionality. Reference numerals of the intra modes shown in FIG. 18A are randomly set, and thus may be easily changed by one of ordinary skill in the art.

According to the intra modes 2 to 10, only adjacent samples obtained from a left block and a lower left block are used to predict the current block. Thus, in a case where the current block is predicted according to the intra modes 2 to 10, the one-dimensional adjacent sample array consists of the adjacent samples obtained from the left block and the lower left block. Then, the one-dimensional adjacent sample array is distinguished based on y-coordinate values of the adjacent samples.

According to the intra modes 26 to 34, only adjacent samples obtained from an upper block or an upper right block are used to predict the current block. Thus, in a case where the current block is predicted according to the intra modes 26 to 34, the one-dimensional adjacent sample array consists of the adjacent samples obtained from the upper block or the upper right block. Then, the one-dimensional adjacent sample array is distinguished based on x-coordinate values of the adjacent samples.

According to the intra modes 11 to 25, the adjacent samples obtained from the upper block and the adjacent samples obtained from the left block are all used, thus, one of the adjacent samples obtained from the upper block and the adjacent samples obtained from the left block has to be converted to generate the one-dimensional adjacent sample array. An embodiment about a method of generating the one-dimensional adjacent sample array by converting adjacent samples will now be described with reference to FIG. 18B.

Figure 18B:
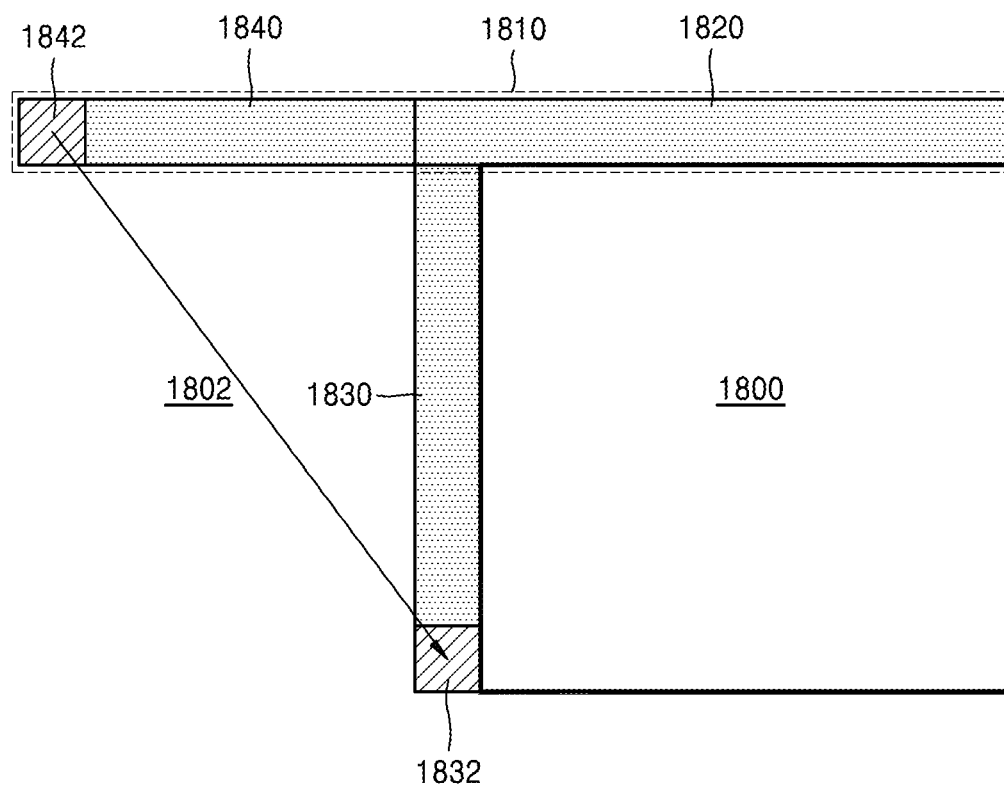

FIG. 18B illustrates a method of generating the one-dimensional adjacent sample array for the intra modes 18 to 25.

Left adjacent samples 1830 of a current block 1800 are converted to converted adjacent samples 1840 according to an intra mode direction 1802 of the current block 1800. In more detail, the converted adjacent samples 1840 are determined to be equal to the left adjacent samples 1830 indicated by the intra mode direction 1802 from the converted adjacent samples 1840. For example, a converted adjacent sample 1842 of a one-dimensional adjacent sample array 1810 is determined to be equal to a left adjacent sample 1832 indicated by the intra mode direction 1802.

Upper adjacent samples 1820 of the current block 1800 and the converted adjacent samples 1840 are included in the one-dimensional adjacent sample array 1810. Adjacent samples included in the one-dimensional adjacent sample array 1810 have a same y-coordinate value. Thus, locations of the samples in the one-dimensional adjacent sample array 1810 are distinguished based on x-coordinate values. That is, the locations of the samples included in the one-dimensional adjacent sample array 1810 are expressed as one reference value.

Unlike the embodiment of FIG. 18B, in the intra modes 18 to 25, a one-dimensional adjacent sample array is vertically arranged. Thus, upper adjacent samples are converted and then are included with left adjacent samples in the one-dimensional adjacent sample array. Locations of adjacent samples in the one-dimensional adjacent sample array are distinguished based on y-coordinate values.

The reference sample determiner 1720 determines a reference sample to be referred to by a current sample, from a one-dimensional adjacent sample array consisting of adjacent samples, according to an intra mode of a current block. In more detail, an adjacent sample that is from among the adjacent samples of the one-dimensional adjacent sample array and is indicated by a direction of the intra mode of the current block is determined to be the reference sample. A method of determining a reference sample will now be described with reference to FIGS. 19A and 19B.

Figure 19A:
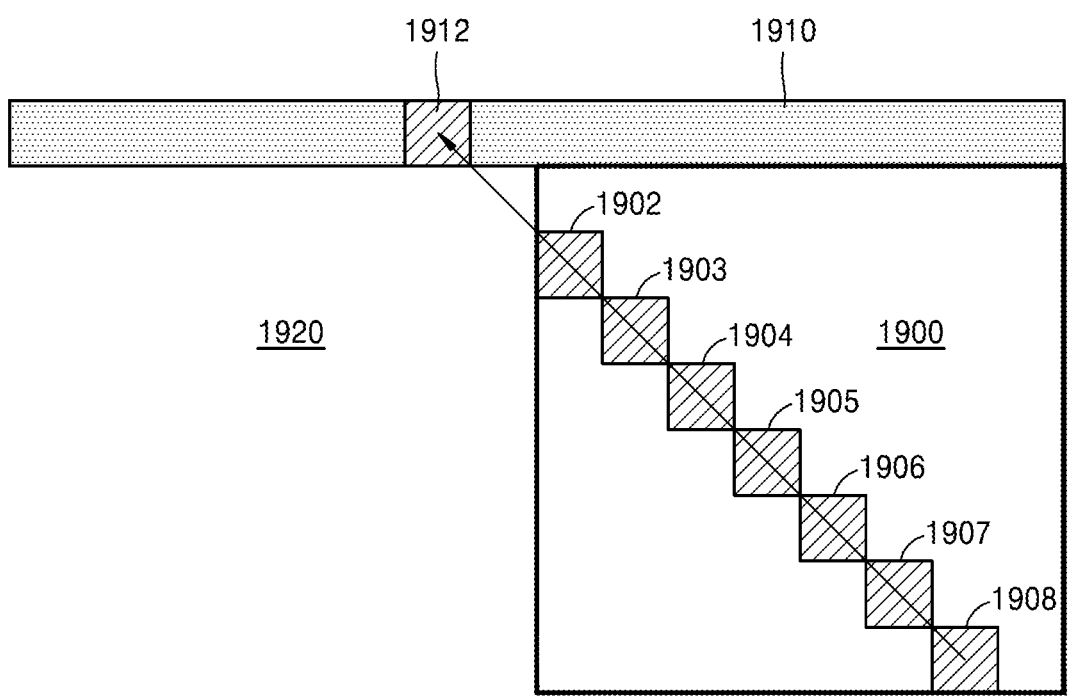
FIGS. 19A and 19B illustrate a method of determining a reference sample according to a location of a current sample and an intra mode of a current block.

FIG. 19A illustrates a method of determining a reference sample according to a location of a current sample and an intra mode of a current block.

A current block 1900 is predicted according to an intra mode 1920 in a diagonal direction. Thus, an adjacent sample 1912 that is located in a direction of the intra mode 1920 from a current sample 1902 is determined to be a reference sample. A prediction value of the current sample 1902 is determined to be equal to the adjacent sample 1912 that is the reference sample. Equally, samples 1903, 1904, 1905, 1906, 1907, and 1908 that use the adjacent sample 1912 as the reference sample in a same manner as the current sample 1902 have a same prediction value. As a result, a predicted block of the current block 1900 has a diagonally-striped texture according to a prediction direction of the intra mode 18 1920.

Figure 19B:
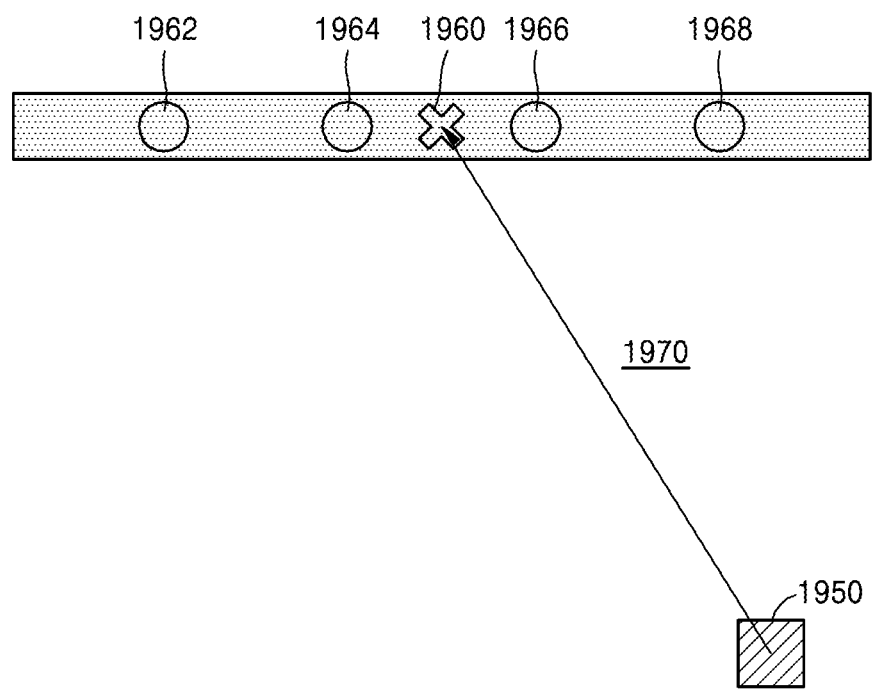

FIG. 19B illustrates a method of determining a reference sample of a current sample when the current sample refers to a subsample.

A reference location of the reference sample indicated by a direction of an intra mode from the current sample has an integer value and a decimal value. When the decimal value is 0, the reference sample is determined as an adjacent sample of a one-dimensional adjacent sample array. However, when the decimal value is not 0, the reference sample may be determined as a subsample of the one-dimensional adjacent sample array. The subsample indicates a sample located between adjacent samples and is determined according to the adjacent samples. When a current block is in an intra mode in a diagonal direction, there is a high probability that the subsample is determined to be the reference sample.

Referring to FIG. 19B, a reference sample of a current sample 1950 is determined as a subsample 1960 indicated by a prediction direction of a diagonal-directional intra mode 1970 from a current sample 1950. The subsample 1960 is located between an adjacent sample 1964 and an adjacent sample 1966, and a sample value of the subsample 1960 may be determined based on the adjacent sample 1964 and the adjacent sample 1966. For example, the sample value of the subsample 1960 may be determined according to linear interpolation using a decimal value of a reference location and the adjacent samples 1964 and 1966. As another example, the sample value of the subsample 1960 may be determined according to spline interpolation or DCT-based interpolation using the decimal value of the reference location and the adjacent samples 1962, 1964, 1966, and 1968. The generated subsample is determined to be the reference sample and is used to predict the current sample.

The predictor 1730 adjusts a sample value of the reference sample according to a reference distance, and determines the adjusted sample value of the reference sample to be a prediction value of the current sample.

The reference distance is determined based on a distance between the reference sample and the current sample. For example, the distance between the reference sample and the current sample may be determined as the reference distance. Alternatively, for convenience of calculation, one of a horizontal distance and a vertical distance between the reference sample and the current sample may be determined as the reference distance. The horizontal distance indicates a difference between an x component of a location of the reference sample and an x component of a location of the current sample, and the vertical distance indicates a difference between a y component of the location of the reference sample and a y component of the location of the current sample.

For example, in a case where the horizontal distance is greater than the vertical distance, the horizontal distance may be determined as the reference distance. On the contrary, in a case where the vertical distance is greater than the horizontal distance, the vertical distance may be determined as the reference distance. Thus, when the intra mode is a horizontal directional intra mode close to a horizontal mode, the reference distance is defined as a horizontal distance between the reference sample and the current sample. On the contrary, when the intra mode is a vertical directional intra mode close to a vertical mode, the reference distance is defined as a vertical distance between the reference sample and the current sample.

The reference sample may be adjusted according to the reference distance. When the reference distance is small, a correlation between the current sample and the reference sample is high. Thus, there is a high probability that the current sample has a same value as the reference sample. Thus, even if the current sample is predicted based on the reference sample, a probability that a great prediction error is to occur is small.

However, when the reference distance is great, the correlation between the current sample and the reference sample is relatively small. Thus, when the current sample is predicted based on the reference sample, the probability that the great prediction error is to occur is increased such that a coding rate may be decreased. Thus, when the reference distance is increased, there is a need to decrease a prediction error by significantly adjusting the reference sample.

When the reference distance is determined as one of the horizontal distance and the vertical distance between the reference sample and the current sample, a direction of the intra mode may be additionally considered while the reference sample is adjusted. In particular, when the direction of the intra mode is a diagonal direction, a difference between the reference distance and an actual distance between the reference sample and the current sample may be great. Thus, to perform accurate prediction, the reference sample may be adjusted according to the direction of the intra mode.

The reference sample may be adjusted according to an adjacent-samples representative value and the reference distance, or may be adjusted by using a smoothing filter according to the reference distance. The sample value of the reference sample may be changed by adjusting the reference sample. Hereinafter, an adjusting method according to the adjacent-samples representative value and the reference distance will now be described with reference to FIG. 20 and Equation 1, and an adjusting method using the smoothing filter according to the reference distance will now be described with reference to FIG. 21A and Equation 2.

The predictor 1730 may determine the adjacent-samples representative value representing a plurality of adjacent samples, and may adjust the sample value of the reference sample according to the adjacent-samples representative value and the reference distance. Then, the predictor 1730 may determine the prediction value of the current sample according to the sample value of the reference sample and the adjacent-samples representative value. A method of adjusting the reference sample according to the adjacent-samples representative value and the reference distance will now be described with reference to Equation 1 and FIG. 20.

The adjacent-samples representative value is determined from the plurality of adjacent samples included in a one-dimensional adjacent sample array. Then, the adjacent-samples representative value is determined as an average of at least two adjacent samples including the reference sample. For example, the adjacent-samples representative value may be determined as the sample value of the reference sample and a local average of sample values of adjacent samples adjacent to the reference sample. In more detail, an average of sample values of the reference sample, an adjacent sample located in the immediate left of the reference sample, and an adjacent sample located in the immediate right of the reference sample may be determined to be the adjacent-samples representative value.

The number of adjacent samples used to determine an adjacent-samples representative value may be determined according to a size of the current block. When the size of the current block is small, an average of two or three adjacent samples may be determined to be the adjacent-samples representative value. On the other hand, when the size of the current block is large, an average of at least four adjacent samples may be determined to be the adjacent-samples representative value, in proportion to the size of the current block. In addition, the number of adjacent samples may be adaptively determined from encoding information obtained from the current block or adjacent blocks of the current block.

The adjacent-samples representative value may be determined as an average of all adjacent samples included in the one-dimensional adjacent sample array. Thus, all adjacent-samples representative values used to predict the current block may be determined as a same value.

The prediction value of the current sample may be determined according to the reference sample and the adjacent-samples representative value. For example, the prediction value of the current sample is determined as a weighted average of the sample value of the reference sample and the adjacent-samples representative value. Thus, the reference sample may be adjusted based on a weight of the reference sample and a weight of the adjacent-samples representative value. For example, when the weight of the reference sample is greater than the weight of the adjacent-samples representative value, the reference sample is slightly adjusted. On the contrary, when the weight of the reference sample is less than the weight of the adjacent-samples representative value, the reference sample is significantly adjusted.

The weights used for the weighted average may be determined according to the reference distance. When the reference distance is small, a probability that the reference sample is equal to the current sample is high, thus, the weight of the reference sample is determined to be greater than the weight of the adjacent-samples representative value. On the contrary, when the reference distance is great, a probability that a difference between the reference and the current sample is great is high, thus, the weight of the adjacent-samples representative value is determined to be greater than the weight of the reference sample. Therefore, as the reference distance is increased, the weight of the reference sample is decreased and the weight of the adjacent-samples representative value is increased.

When the reference distance is determined as one of the horizontal distance and the vertical distance between the reference sample and the current sample, the direction of the intra mode may affect determination of the weights with respect to the reference sample and the adjacent-samples representative value. For example, when the direction of the intra mode is a diagonal direction, the weight with respect to the adjacent-samples representative value may be increased.

When the reference distance is increased, the weight of the adjacent-samples representative value may be linearly increased. In another embodiment, the weight of the adjacent-samples representative value may be non-linearly or piece-wise linearly increased. On the contrary, the weight of the reference sample may be linearly, non-linearly, or piece-wise linearly decreased according to an increase in the reference distance.

The weights of the reference sample and the adjacent-samples representative value may be determined as weights that are determined to cause a minimum prediction error, according to statistical results.

The adjustment of the reference sample according to the reference distance may be performed by using Equation 1 below. A denotes the sample value of the reference sample, and DC denotes the adjacent-samples representative value. S denotes a sum of the weight of the reference sample and the weight of the adjacent-samples representative value, and w denotes the weight of the adjacent-samples representative value. A' denotes the adjusted reference sample.

$$A'=((S-w)*A+(w)*DC)/S \qquad \text{[Equation 1]}$$

S may be determined as a length of a side of the current block or a multiple of the length of the side. S may be determined according to the actual distance between the reference sample and the current sample, in consideration of the direction of the intra mode.

w is determined to be less than S. Thus, the weights of the reference sample and the adjacent-samples representative value are determined to be certainly greater than 0. A maximum value of w may be determined to be equal to or less than S. Thus, the weight of the reference sample, i.e., S−w, may be set to be constantly greater than 0.

w is set to be increased according to the reference distance. w may be set to be linearly increased in proportion to the reference distance. Also, when a linear increase in w is not optimal according to the statistical results with respect to the reference distance and the prediction error, w may be set to be linearly or piece-wise linearly increased. A value of w may be randomly determined according to the statistical results with respect to the reference distance and the prediction error.

w may be determined with respect to all blocks by using a same determining method. Also, w may be adaptively determined according to a characteristic of the current block or information received from a bitstream.

DC may be determined as an average of all adjacent samples included in the one-dimensional adjacent sample array. Also, DC may be determined as a regional average of the reference sample and adjacent samples adjacent to the reference sample. The number of the adjacent samples that are required to calculate the regional average may be determined based on a size of the current block.

An embodiment of the aforementioned method of adjusting the sample value of the reference sample according to the reference distance and the adjacent-samples representative value will now be described with reference to FIG. 20.

Figure 20:
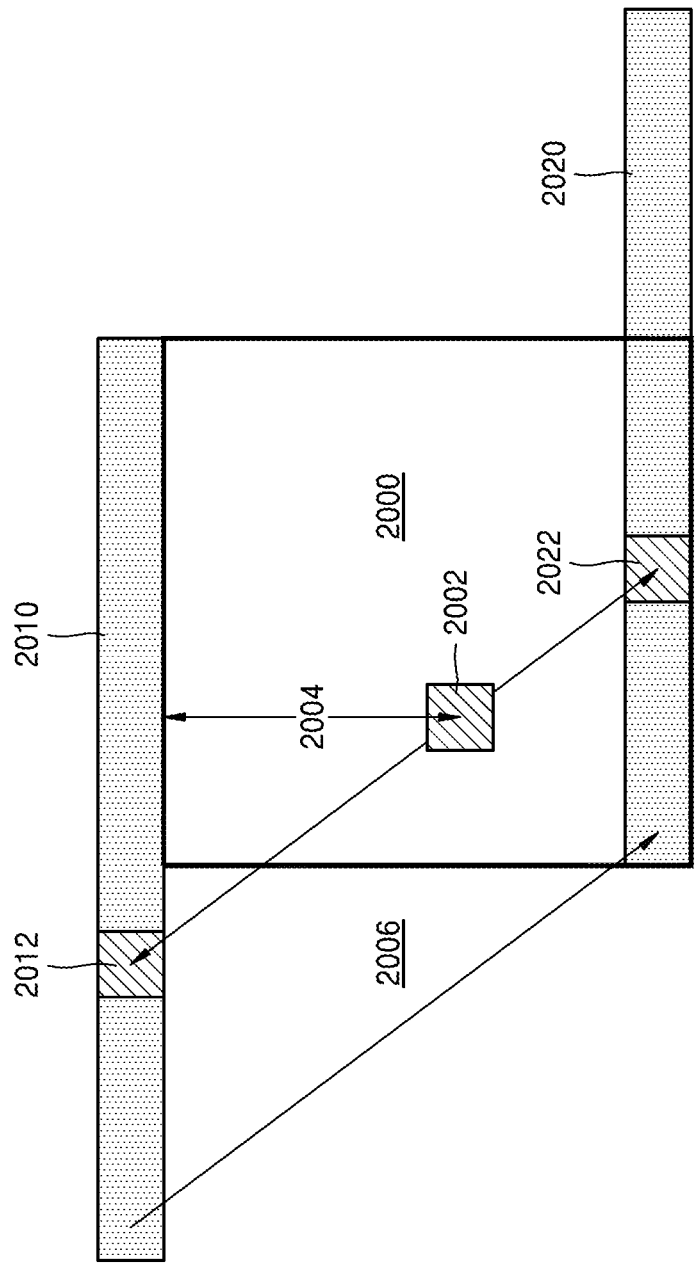
FIG. 20 illustrates a method of adjusting a sample value of a reference sample according to a reference distance and an adjacent-samples representative value.

FIG. 20 illustrates an embodiment of a method of adjusting a sample value of a reference sample according to a reference distance and an adjacent-samples representative value in a vertical directional intra mode.

First, a one-dimensional adjacent sample array 2010 including adjacent samples of a current block 2000 is determined. Also, a one-dimensional representative value array 2020 including an adjacent-samples representative value obtained from the adjacent samples included in the one-dimensional adjacent sample array 2010 is obtained. The one-dimensional adjacent sample array 2010 and the one-dimensional representative value array 2020 are arranged in a horizontal direction.

A reference sample 2012 to be used to predict a current sample 2002 is determined from the one-dimensional adjacent sample array 2010 according to an intra mode 2006 to be applied to the current block 2000. An adjacent-samples representative value 2022 corresponding to the reference sample 2012 is determined from the one-dimensional representative value array 2020. Because a vertical distance between the current sample 2002 and the reference sample 2012 is greater than a horizontal distance between the current sample 2002 and the reference sample 2012, a reference distance 2004 of the reference sample 2012 is determined as the vertical distance between the current sample 2002 and the reference sample 2012.

A sample value of the reference sample 2012 may be adjusted according to the reference distance 2004 and the adjacent-samples representative value 2022 by using Equation 1. The adjacent-samples representative value 2022 may be an average of all adjacent samples included in the one-dimensional adjacent sample array 2010, or may be a regional average of adjacent samples that are from among the one-dimensional adjacent sample array 2010 and are adjacent to the reference sample 2012. A weight of the reference sample 2012 and a weight of the adjacent-samples representative value 2022 are determined according to the reference distance 2004.

For example, in a case where the weight of the adjacent-samples representative value 2022 is determined to be equal to the reference distance 2004, the reference distance 2004 is 5, and a sum of the weight of the adjacent-samples representative value 2022 and the weight of the reference sample 2012 is 8, the weight of the adjacent-samples representative value 2022 may be determined as 5 and the weight of the reference sample 2012 may be determined as 3.

A sum of the weight of the reference sample 2012 and the weight of the adjacent-samples representative value 2022 may be determined according to a size of a current block. However, a sum of the weights of the reference sample 2012 and the adjacent-samples representative value 2022 may be determined according to another characteristic of the current block or may be set to have a constant value regardless of the size of the current block.

The current sample 2002 is predicted according to the reference sample 2012 that is adjusted according to the adjacent-samples representative value 2022 and the reference distance 2004. In more detail, a prediction value of the current sample 2002 is determined to be a same value as an adjusted sample value of the reference sample 2012.

The method of adjusting a reference sample according to a reference distance and an adjacent-samples representative value is described above. Hereinafter, a reference sample adjusting method using a smoothing filter for a reference sample according to a reference distance, the reference sample adjusting method being performed to adjust the reference sample, will now be described.

The predictor 1730 may smooth a sample value of a reference sample by using a smoothing filter selected according to a reference distance. Then, the predictor 1730 may determine a sample value of the smoothed reference sample to be a prediction value of a current sample. In the present specification, a smoothing operation refers to adjusting the sample value of the reference sample so as to allow the sample value of the reference sample to have continuity with respect to sample values of samples adjacent to the reference sample.

The smoothing filter is an N-tap filter including N filter coefficients. For example, in a case where the smoothing filter is a 3-tap filter including smoothing filter coefficients of [¼, 2/4, ¼], and is applied to an adjacent sample P(X−1) located in the immediate left of a reference sample, a reference sample P(X), and an adjacent sample P(X+1) located in the immediate right of the reference sample, the reference sample to which the smoothing filter has been applied is {P(X−1)+2*P(X)+P(X+1)}/4.

The number of filter coefficients may be determined according to at least one of a size of a current block, a reference distance, and an intra mode. When the size of the current block is increased, the number of filter coefficients included in the smoothing filter may be increased. Also, the number of filter coefficients may be increased according to the reference distance and the intra mode.

The filter coefficient may be determined according to smoothing intensity. To decrease the smoothing intensity of the smoothing filter, a filter coefficient applied to the reference sample is set to be greater than a filter coefficient applied to adjacent samples of the reference sample. On the contrary, to increase the smoothing intensity of the smoothing filter, the filter coefficient applied to the reference sample is set to be equal to the filter coefficient applied to the adjacent samples of the reference sample.

The smoothing intensity may be set to be increased according to an increase in the reference distance. For example, the smoothing intensity may be set to be increased in linear proportion to the reference distance. As another example, the smoothing intensity may be set to be non-linearly or piece-wise linearly increased according to the increase in the reference distance. The smoothing intensity may be randomly determined according to the statistical results with respect to the reference distance and the prediction error.

The smoothing operation may be performed by applying the smoothing filter on the reference sample several times. For example, when the reference distance is 1, the smoothing filter may be applied to the reference sample one time, and when the reference distance is 2, the smoothing filter may be applied to the reference sample two times. A same smoothing filter may be repeatedly used to smooth the reference sample. Alternatively, according to the reference distance, different smoothing filters may be sequentially used.

Figure 21A:
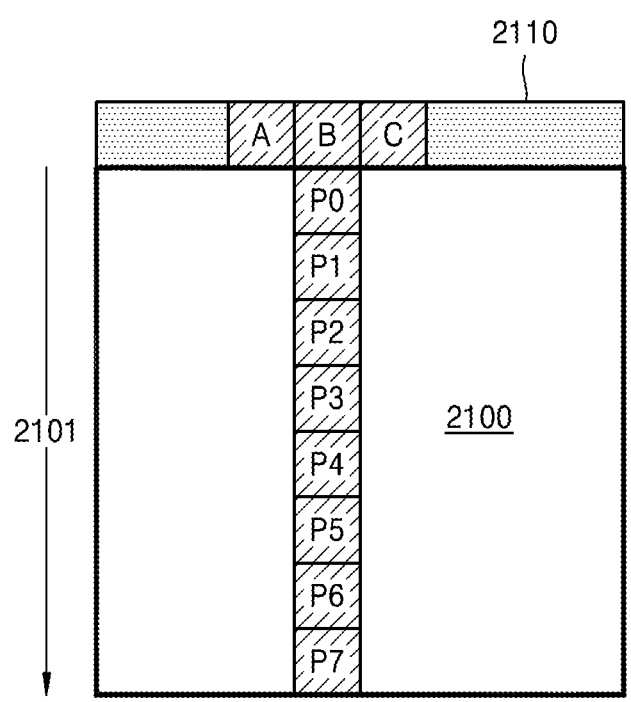
FIGS. 21A and 21B illustrate a method of adjusting a reference sample by using a smoothing filter according to a reference distance.

FIG. 21A illustrates an embodiment of a smoothing filter according to a reference distance.

A vertical-direction intra mode 2101 is applied to a current block 2100. Thus, reference samples P0 to P7 are all determined as an adjacent sample B located at a same column as P0 to P7.

The reference samples P0 to P7 are adjusted by using a smoothing filter according to each of reference distances of P0 to P7. The reference distances of P0 to P7 are determined as vertical distances from the adjacent sample B. For example, the reference distance of P0 is determined as 1, and the reference distance of P1 is determined as 2.

Smoothing filters are selected based on the reference distances of P0 to P7. For example, when a smoothing filter whose reference distance is 1 is [0, 1, 0], a smoothing filter for P0 may be determined as [0, 1, 0]. As another example, when a smoothing filter whose reference distance is 4 is [¼, ½, ¼], a smoothing filter for P4 may be determined as [¼, ½, ¼]. As another example, when a smoothing filter whose reference distance is 8 is [⅓, ⅓, ⅓], a smoothing filter for P7 may be determined as [⅓, ⅓, ⅓]. Smoothing intensity of the smoothing filters to be applied to the reference samples P0 to P7 is designed to be increased when the reference distances of P0 to P7 are increased.

Referring to FIG. 21A, the smoothing filter is described as a 3-tap filter having three filter coefficients, but the smoothing filter may have more filter coefficients. Also, the number of filter coefficients may be determined according to an intra mode or a size of a current block.

P0 to P7 may be adjusted by applying the smoothing filters to adjacent samples A, B, and C included in a one-dimensional adjacent sample array 2110. The adjacent sample B is a reference sample of P0 to P7, and the adjacent samples A and C are adjacent samples adjacent to the adjacent sample B that is the reference sample, the adjacent samples A and C being used to smooth the reference sample. Because the smoothing filter of [0, 1, 0] is applied to P0 whose reference distance is small, thus, P0 is not smoothed. However, a smoothing operation according to the smoothing filters may be performed on samples whose reference distances are great. For example, because the smoothing filter of [¼, ½, ¼] is applied to P4, P4 may be adjusted to be equal to (¼)*A+(½)*B+(¼)*C. As another example, because the smoothing filter of [⅓, ⅓, ⅓] is applied to P7, P7 may be adjusted to be equal to (⅓)*A+(⅓)*B+(⅓)*C. P1, P2, P3, P5, and P6 may also be adjusted by using the smoothing filters according to the reference distances.

A method described with reference to FIG. 21A may be applied to intra modes in different directions. Also, the method described with reference to FIG. 21A may be applied to a current block having a different size.

The predictor 1730 may determine a sample value of a smoothed reference sample as a prediction value of a current sample. When a smoothing filter is defined with respect to a reference distance of the current sample, the sample value of the reference sample smoothed according to the smoothing filter of the current sample is determined to be the prediction value of the current sample. However, when the smoothing filter is not defined with respect to the reference distance of the current sample, the predictor 1730 may adjust the sample value of the reference sample by using a smoothing filter defined with respect to another reference distance.

When the smoothing filter is not defined with respect to the reference distance, the predictor 1730 may search for a first distance and a second distance for which smoothing filters are defined. The first distance is less than the reference distance of the current sample, and the second distance is greater than the reference distance of the current sample. It is preferable that a difference between the first distance and the reference distance, and a difference between the second distance and the reference distance are small.

The predictor 1730 may obtain a first median value by smoothing the sample value of the reference sample according to the smoothing filter with respect to the first distance. Equally, the predictor 1730 may obtain a second median value by smoothing the sample value of the reference sample or the first median value according to the smoothing filter with respect to the second distance.

Then, the predictor 1730 may determine the prediction value of the current sample by using the first median value and the second median value. For example, a weighted average of the first median value and the second median value may be determined to be the prediction value of the current sample. To determine weights of the first median value and the second median value, a rate of the difference between the first distance and the reference distance and the difference between the second distance and the reference distance may be considered.

Then, the predictor 1730 may additionally search for a third distance, a fourth distance, or the like for which smoothing filters are defined, and may obtain a third median value and a fourth median value according to the third distance, the fourth distance, or the like. Then, the prediction value of the current sample may be determined by using three or more median values.

When the smoothing filter is not defined with respect to the reference distance, adjustment of the reference sample according to the reference distance may be performed by using Equation 2 below. A[i] denotes a first median value, and A[i+1] denotes a second median value. x denotes a weight of the first median value, and y denotes a weight of the second median value. A' denotes an adjusted reference sample.

$$A'=((x)*A[i]+(y)*A[i+1])/(x+y) \quad\quad \text{[Equation 2]}$$

x is determined according to a difference between a first distance and the reference distance. x may be determined to be decreased when the difference between the first distance and the reference distance is increased. y is determined according to a difference between a second distance and the reference distance. y may be determined to be decreased when the difference between the second distance and the reference distance is increased. Also, x, y may be determined according to an interpolation method of determining A'.

The predictor 1730 may predict all samples included in the current block, according to the aforementioned method of adjusting a reference sample by using a smoothing filter.

Figure 21B:
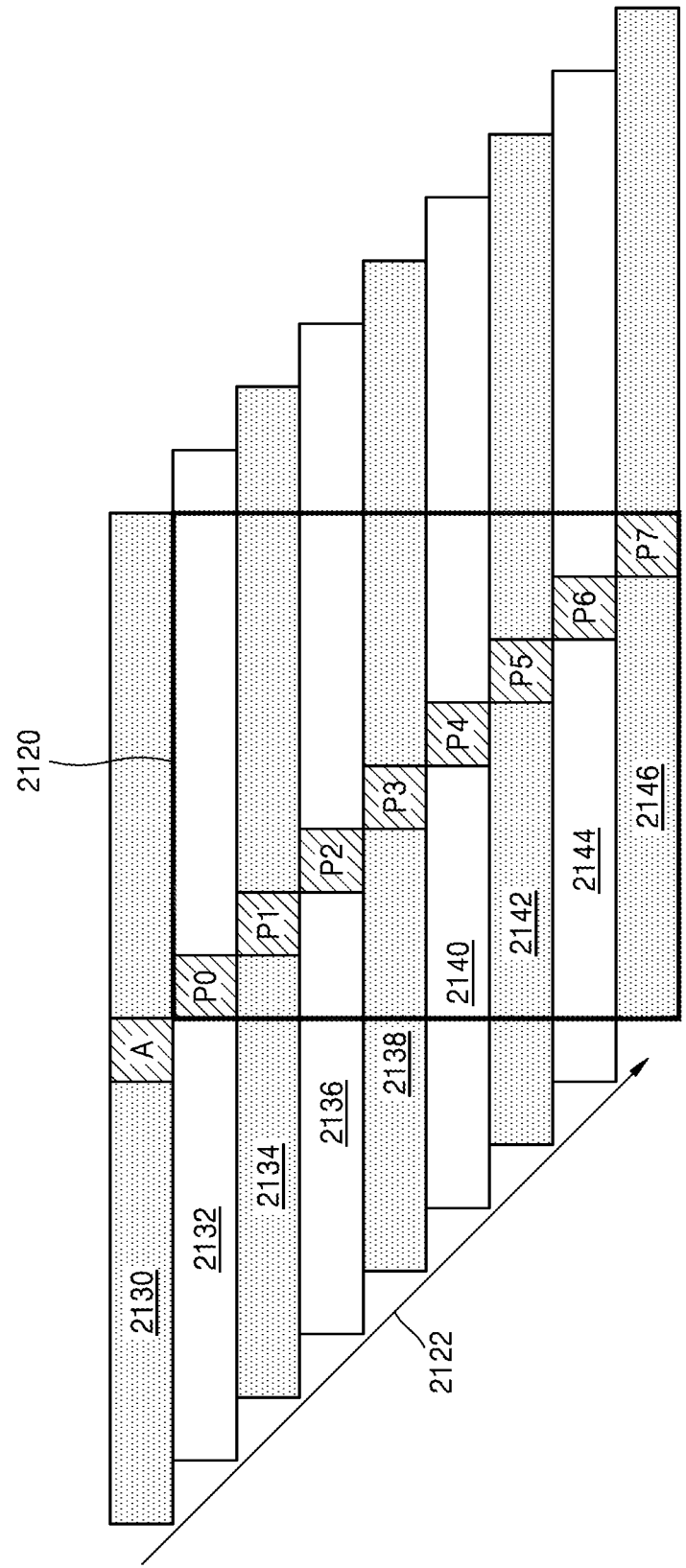

FIG. 21B illustrates an embodiment of a method of predicting a current block 2120 when only a smoothing filter is defined with respect to a particular reference distance.

The current block 2120 is predicted according to a direction of an intra mode 2122. An adjacent sample A is determined to be a reference sample for all P0 to P7 included in the current block 2120.

In the embodiment of FIG. 21B, smoothing filters are defined only for reference distances of multiples of 2. Thus, prediction values of P1, P3, P5, and P7 may be obtained by smoothing a sample value of the adjacent sample A that is a reference sample. Alternatively, the prediction values P3, P5, and P7 may be obtained by sequentially smoothing P1, P3, and P5.

However, because smoothing filters are not defined with respect to P0, P2, P4, and P6, prediction values may be obtained based on P1, P3, P5, and P7.

For example, the prediction values may be obtained in a manner that P0 is obtained according to the adjacent sample A and P1, P2 is obtained according to P1 and P3, P4 is obtained according to P3 and P5, and P6 is obtained according to P5 and P7. Thus, the predictions values of P0 to P7 have continuity.

In addition to P0 to P7, all samples in the current block 2120 may be predicted according to the aforementioned method. Samples located at a second column 2134, a fourth column 2138, a sixth column 2142, and an eighth column 2146 may be predicted by smoothing adjacent samples of a one-dimensional adjacent sample array 2130 according to smoothing filters. Alternatively, the samples of the fourth column 2138 may be predicted by smoothing samples of a second column 2134, the samples of the sixth column 2142 may be predicted by smoothing the samples of the fourth column 2138, and the samples of eighth column 2146 may be predicted by smoothing the samples of the sixth column 2142.

Samples located at a first column 2132, a third column 2136, a fifth column 2140, and a seventh column 2144 may be predicted based on samples located at the second column 2134, the fourth column 2138, the sixth column 2142, and the eighth column 2146.

FIG. 21B illustrates a case in which the smoothing filters are defined for the reference distances of multiples of 2, but in another embodiment, smoothing filters may be defined for reference distances of multiples of 4 or 8. In another embodiment, reference distances for which smoothing filters are defined may be irregularly defined.

The adjusting methods of FIGS. 20 to 21B may be different in calculation processes but may derive a same adjustment result. Thus, the adjusting methods of FIGS. 20 to 21B may be exchanged therebetween.

The predictor 1730 may predict the current block 2120 according to the aforementioned method of adjusting a reference sample, and then may smooth prediction values of samples included in the current block 2120 by using a one-dimensional filter or a second-dimensional filter in a vertical direction of a prediction direction indicated by an intra mode of the current block 2120. Whether to smooth the prediction values of the samples included in the current block 2120 may be determined according to information indicating whether to smooth prediction values, or may be determined according to a size and shape of the current block 2120, the intra mode of the current block 2120, or the like. According to an embodiment, the predictor 1730 may smooth prediction values of all samples included in the current block 2120. According to another embodiment, the predictor 1730 may smooth only prediction values of dis-continuous samples included in the current block 2120. For example, when some samples from among adjacent samples are discontinuous, only prediction values of samples predicted from discontinuous adjacent samples may be smoothed.

The predictor 1730 may determine whether a reference sample is adjusted to intra predict a current block. Thus, when it is determined that the reference sample is adjusted to intra predict the current block, the predictor 1730 predicts the current sample according to the reference sample that was adjusted based on a reference distance. On the other hand, when the reference sample is not adjusted to intra predict the current block, the predictor 1730 predicts the current sample according to the reference sample, without consideration of the reference distance.

When a function of the image predicting apparatus 1700 is performed by the encoder 110 of FIG. 1A, the encoder 110 compares coding efficiency of a case where the reference sample is adjusted to intra predict the current block with coding efficiency of a case where the reference sample is not adjusted to intra predict the current block, and then determines whether to adjust the reference sample so as to intra predict the current block. Then, the encoder 110 generates reference sample adjustment information indicating whether to adjust the reference sample so as to intra predict the current block, and the output unit 120 of FIG. 1A outputs a bitstream including the reference sample adjustment information.

The reference sample adjustment information may be generated with respect to a prediction unit or an upper data unit including the prediction unit. For example, the reference sample adjustment information may be generated with respect to a coding unit, a largest coding unit, a slice, a picture, or the like which is the upper data unit of the prediction unit.

Also, the reference sample adjustment information may be generated with respect to two types of a data unit. First reference sample adjustment information may be generated with respect to the upper data unit, and second reference sample adjustment information may be generated with respect to a lower data unit.

The first reference sample adjustment information may indicate whether reference sample adjustment is allowed with respect to the upper data unit. When the first reference sample adjustment information indicates that the reference sample adjustment is allowed, the second reference sample adjustment information may indicate whether the reference sample adjustment is allowed with respect to the lower data unit included in the upper data unit. For example, in a case where the first reference sample adjustment information generated with respect to the upper data unit does not allow the reference sample adjustment, the reference sample adjustment is not allowed with respect to all lower data units included in the upper data unit. Thus, the second reference sample adjustment information is not generated with respect to all lower data units. On the other hand, in a case where the first reference sample adjustment information generated with respect to the upper data unit allows the reference sample adjustment, the second reference sample adjustment information indicating whether to perform the reference sample adjustment on each of the lower data units is generated with respect to all lower data units.

According to another embodiment, the first reference sample adjustment information may indicate whether the reference sample adjustment is surely performed on the upper data unit. When the first reference sample adjustment information indicates that the reference sample adjustment is surely performed, the second reference sample adjustment information may indicate whether to perform the reference sample adjustment on the lower data unit included in the upper data unit. For example, when the first reference sample adjustment information generated with respect to the upper data unit indicates that the reference sample adjustment is surely performed, the reference sample adjustment is performed on all lower data units included in the upper data unit. Thus, the second reference sample adjustment information is not generated with respect to all lower data units. On the other hand, when the first reference sample adjustment information indicates that the reference sample adjustment is not surely performed, the second reference sample adjustment information indicating whether to perform the reference sample adjustment on each lower data unit is generated with respect to all lower data units included in the upper data unit.

According to another embodiment, the first reference sample adjustment information may be generated to indicate one of a case where the reference sample adjustment is performed on all lower data units, a case where the reference sample adjustment is not performed on all lower data units, and a case where the reference sample adjustment is determined according to the second reference sample adjustment information with respect to each lower data unit.

In the aforementioned embodiment, the upper data unit may include a sequence, a picture, a slice, or the like, and the lower data unit may include a largest coding unit, a coding unit, a prediction unit, or the like.

When a particular condition is satisfied with respect to the current block and the upper data unit of the current block, the encoder 110 may apply the reference sample adjustment to intra prediction for the current block. For example, the encoder 110 may be set to apply the reference sample adjustment when a size of the current block is larger than a certain size. When a block is small, a maximum value of a reference distance is small, such that coding efficiency that may be achieved by adjusting the reference sample may be low. Thus, the reference sample adjustment may be performed on a block having a large size for which coding efficiency due to the reference sample adjustment is stochastically high.

As another example, whether to apply the reference sample adjustment may be determined according to a type of a slice. For example, the encoder 110 may be set to apply the reference sample adjustment only to I slice for which only intra prediction is used, and not to apply the reference sample adjustment to P slice and B slice for which inter prediction and intra prediction are used in parallel.

Also, whether to apply the reference sample adjustment may be determined according to whether a color component of the current block is a luma component or a chroma component. Whether to apply the reference sample adjustment may be determined according to which layer of a multilayer image the current block belongs to. In addition, whether to apply the reference sample adjustment may be determined according to various attributes of the current block and the upper data unit of the current block.

Only when it is not possible to determine whether to apply the reference sample adjustment by using the attributes of the current block and the upper data unit of the current block, the encoder 110 may compare coding efficiency of a case where the reference sample is adjusted to intra predict the current block with coding efficiency of a case where the reference sample is not adjusted to intra predict the current block, and then may determine whether to adjust the reference sample so as to intra predict the current block. Thus, when it is not possible to determine whether to apply the reference sample adjustment by using only the attributes of the current block and the upper data unit of the current block, the encoder 110 may generate the reference sample adjustment information indicating whether the reference sample is adjusted to intra predict the current block. Thus, compared to an example where the reference sample adjustment information is generated for all blocks, a generation amount of the reference sample adjustment information is decreased such that coding efficiency may be improved. When the function of the image predicting apparatus 1700 is performed by the decoder 170 of FIG. 1B, the decoder 170 may determine whether the reference sample adjustment is performed on the current block, according to the reference sample adjustment information received from the receiver 160 of FIG. 1B. Also, the decoder 170 may determine whether the reference sample adjustment is performed on the current block, according to the attributes of the current block or the upper data unit of the current block. Because the encoder 110 and the decoder 170 correspond to each other, descriptions about a method, performed by the decoder 170, of determining whether to reference sample adjustment are omitted here.

Figure 22:
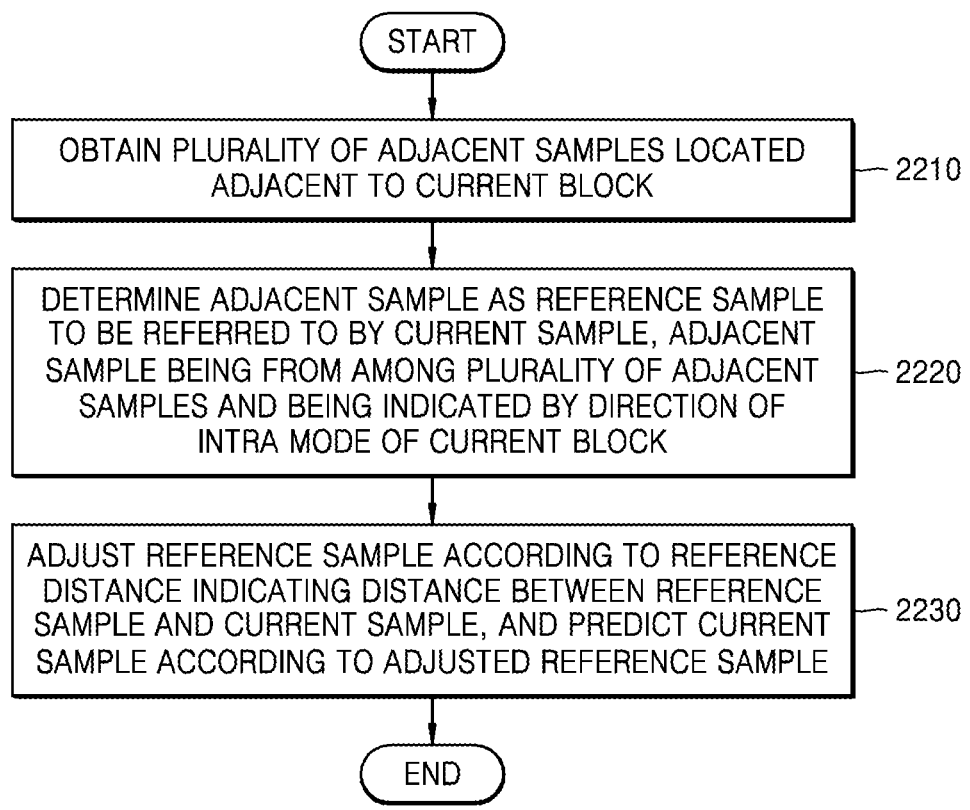
FIG. 22 is a flowchart indicating a method of predicting a current sample by adjusting a reference sample of the current sample according to a reference distance of the current sample.

FIG. 22 is a flowchart indicating a method of predicting a current sample by adjusting a reference sample of the current sample according to a reference distance of the current sample.

In operation 2210, a plurality of adjacent samples located adjacent to a current block are obtained. When it is not possible to obtain an adjacent sample at a particular location from an adjacent block, the adjacent sample at the particular location is generated by using the obtained adjacent samples. The adjacent samples may be smoothed according to a degree of a difference between the adjacent samples. A one-dimensional adjacent sample array including the adjacent samples may be determined according to an intra mode of the current block.

In operation 2220, an adjacent sample that is from among the plurality of adjacent samples and is indicated by a direction of the intra mode of the current block is determined as a reference sample. When the direction of the intra mode of the current block indicates a subsample between the adjacent samples, the subsample may be determined to be the reference sample.

In operation 2230, the reference sample is adjusted according to the reference distance, and the current sample is predicted according to the adjusted reference sample.

The reference sample may be adjusted according to an adjacent-samples representative value and the reference distance. Also, the reference sample may be adjusted by using a smoothing filter according to the reference distance.

When the reference sample is adjusted according to the adjacent-samples representative value and the reference distance, first, the adjacent-samples representative value representing the plurality of adjacent samples is determined. Afterward, the reference sample is adjusted according to a weighted average of the reference sample and the adjacent-samples representative value. Then, the current sample is predicted according to the adjusted reference sample.

The adjacent-samples representative value may be determined as an average of all adjacent samples included in the one-dimensional adjacent sample array. Also, the adjacent-samples representative value may be determined as a regional average of at least two adjacent samples including the reference sample. The number of adjacent samples used to determine the regional average may be determined according to a size of the current block.

In determination of the weighted average of the reference sample and the adjacent-samples representative value, when the reference distance is increased, a weight of the reference sample is decreased and a weight of the adjacent-samples representative value is increased.

When the reference sample is adjusted by using the smoothing filter according to the reference distance, the reference sample is smoothed by using the smoothing filter selected according to the reference distance, and the current sample is predicted according to the smoothed reference sample. Smoothing intensity of the smoothing filter may be set to be increased when the reference distance is increased.

When the smoothing filter is not defined with respect to the reference distance, a first distance and a second distance for which smoothing filters are defined may be searched for. A first median value may be determined by smoothing the reference sample by using a first smoothing filter selected according to the first distance. Equally, a second median value may be determined by smoothing the reference sample or the first median value by using a second smoothing filter selected according to the second distance. Then, a prediction value of the current sample may be interpolated by using the first median value and the second median value.

Whether to adjust the reference sample may be determined according to the current block or an upper data unit of the current block. Also, whether to adjust the reference sample may be determined according to reference sample adjustment information with respect to the current block.

The current sample may be further accurately predicted according to the aforementioned method of adjusting a reference sample.

The embodiments according to the present disclosure may be written as computer programs and may be implemented in a general-use digital computer that executes the programs by using a computer-readable recording medium.

While the best embodiments of the present disclosure have been described, it will be understood by one of ordinary skill in the art that various replacements, modifications, or changes with respect to the present disclosure may be made therein without departing from the spirit and scope as defined by the following claims. That is, the claims will be construed as including the various replacements, modifications, or changes with respect to the present disclosure. Therefore, the descriptions provided in the specification and drawings should be considered in a descriptive sense only and not for purposes of limitation.

The invention claimed is:

1. An image predicting method comprising:
   obtaining a plurality of adjacent samples located adjacent to a current block;
   determining an adjacent sample as a reference sample to be referred to by a current sample, the adjacent sample being from among the plurality of adjacent samples and being indicated by a direction of an intra mode of the current block; and
   smoothing a sample value of the reference sample by using a smoothing filter selected according to a reference distance; and
   determining the smoothed sample value of the reference sample to be a prediction value of the current sample,
   wherein the smoothing of the reference sample comprises:
   searching for a first distance and a second distance for which smoothing filters are defined, when the smoothing filter is not defined with respect to the reference distance;
   determining a first median value by smoothing the reference sample by using a first smoothing filter selected according to the first distance, and determining a second median value by smoothing the reference sample or the first median value by using a second smoothing filter selected according to the second distance; and
   determining a weighted average of the first median value and the second median value to be the prediction value of the current sample.

2. The image predicting method of claim 1, wherein the determining of the prediction value comprises:
   determining an adjacent-samples representative value representing the plurality of adjacent samples; and
   predicting the current sample according to a weighted average of the sample value of the reference sample and the adjacent-samples representative value,
   wherein weights used in the weighted average are determined based on at least one of the reference distance and the direction indicated by the intra mode.

3. The image predicting method of claim 2, wherein, when the reference distance is increased, a weight of the sample value of the reference sample is decreased and a weight of the adjacent-samples representative value is increased.

4. The image predicting method of claim 2, wherein the adjacent-samples representative value is determined as an average of sample values of the plurality of adjacent samples.

5. The image predicting method of claim 2, wherein
   the adjacent-samples representative value is determined as an average of sample values of at least two adjacent samples comprising the reference sample, and
   a number of adjacent samples used to determine the adjacent-samples representative value is determined according to a size of the current block.

6. The image predicting method of claim 1, wherein, when the reference distance is increased, smoothing intensity of the smoothing filter is increased.

7. The image predicting method of claim 1, wherein,
   when the intra mode is a horizontal directional intra mode, the reference distance indicates a horizontal distance between the reference sample and the current sample; and
   when the intra mode is a vertical directional intra mode, the reference distance indicates a vertical distance between the reference sample and the current sample.

8. The image predicting method of claim 1, wherein, when the direction of the intra mode of the current block indicates a subsample between two adjacent samples, the determining of the reference sample comprises determining the reference sample, based on adjacent samples adjacent to the subsample.

9. The image predicting method of claim 1, further comprising determining whether the adjusting of the sample value of the reference sample is performed in predicting the current block,
   wherein the predicting comprises:
   when it is determined that the adjusting of the sample value of the reference sample is performed, predicting the current sample by adjusting the sample value of the reference sample; and
   when it is determined that the adjusting of the sample value of the reference sample is not performed, predicting the current sample without adjusting the sample value of the reference sample.

10. The image predicting method of claim 9, wherein the determining of whether the adjusting of the sample value of the reference sample is performed comprises:

obtaining reference sample adjustment information indicating whether the adjusting of the sample value of the reference sample is performed in predicting the current block; and determining, based on the reference sample adjustment information, whether the adjusting of the sample value of the reference sample is performed in predicting the current block.

11. The image predicting method of claim 9, wherein the determining of whether the adjusting of the sample value of the reference sample is performed comprises determining whether the adjusting of the sample value of the reference sample is performed, based on at least one of information about a size of the current block, information about a color of the current block, and prediction method information about a prediction method allowed for the current block.

12. An image predicting apparatus comprising:

an adjacent sample obtainer configured to obtain a plurality of adjacent samples located adjacent to a current block;

a reference sample determiner configured to determine an adjacent sample as a reference sample to be referred to by a current sample, the adjacent sample being from among the plurality of adjacent samples and being indicated by a direction of an intra mode of the current block; and a predictor configured to smooth a sample value of the reference sample by using a smoothing filter selected according to a reference distance, and determine the smoothed sample value of the reference sample to be a prediction value of the current sample, wherein the smoothing of the reference sample comprises:

searching for a first distance and a second distance for which smoothing filters are defined, when the smoothing filter is not defined with respect to the reference distance;

determining a first median value by smoothing the reference sample by using a first smoothing filter selected according to the first distance, and determining a second median value by smoothing the reference sample or the first median value by using a second smoothing filter selected according to the second distance; and determining a weighted average of the first median value and the second median value to be the prediction value of the current sample.

13. A computer-readable recoding medium having recorded thereon a program for executing the image predicting method of claim 1.

* * * * *